United States Patent
Roy et al.

(10) Patent No.: US 12,153,876 B2
(45) Date of Patent: Nov. 26, 2024

(54) METHOD AND SYSTEM FOR ASSET GENERATION

(71) Applicant: Lob.com, Inc., San Francisco, CA (US)

(72) Inventors: Shampa Roy, San Francisco, CA (US); Adam Sant, San Francisco, CA (US)

(73) Assignee: Lob.com, Inc., San Francisco, CA (US)

( * ) Notice: Subject to any disclaimer, the term of this patent is extended or adjusted under 35 U.S.C. 154(b) by 0 days.

(21) Appl. No.: 18/194,759

(22) Filed: Apr. 3, 2023

(65) Prior Publication Data

US 2023/0325589 A1    Oct. 12, 2023

Related U.S. Application Data

(60) Provisional application No. 63/336,106, filed on Apr. 28, 2022, provisional application No. 63/326,728, filed on Apr. 1, 2022.

(51) Int. Cl.
*G06F 40/186* (2020.01)
*G06F 40/174* (2020.01)
*G06Q 10/10* (2023.01)

(52) U.S. Cl.
CPC .......... *G06F 40/186* (2020.01); *G06F 40/174* (2020.01); *G06Q 10/10* (2013.01)

(58) Field of Classification Search
CPC ...... G06F 40/186; G06F 40/174; G06Q 10/10
See application file for complete search history.

(56) References Cited

U.S. PATENT DOCUMENTS

| | | | |
|---|---|---|---|
| 9,244,917 B1 * | 1/2016 | Sharma | G06F 16/9577 |
| 2007/0094060 A1 * | 4/2007 | Apps | G06F 16/2428 |
| | | | 705/7.36 |
| 2014/0063555 A1 * | 3/2014 | Park | G06F 40/103 |
| | | | 358/1.18 |
| 2014/0146961 A1 * | 5/2014 | Ristock | H04M 3/5234 |
| | | | 379/265.11 |
| 2015/0331979 A1 * | 11/2015 | Englehart | G06F 30/20 |
| | | | 703/2 |
| 2016/0104213 A1 | 4/2016 | Graziano | |
| 2021/0103975 A1 * | 4/2021 | Walters | G06N 20/00 |
| 2021/0406319 A1 * | 12/2021 | Holt | G06F 16/93 |
| 2022/0164833 A1 * | 5/2022 | Dion | G06V 10/95 |
| 2022/0414714 A1 * | 12/2022 | Maher | G06Q 30/0276 |

OTHER PUBLICATIONS

"Direct Mail Creative Templates", Postalytics, first downloaded Feb. 21, 2023, https://www.postalytics.com/support/documentation/home/direct-mail-creative-templates/#.

(Continued)

*Primary Examiner* — Kyle R Stork
(74) *Attorney, Agent, or Firm* — Jeffrey Schox; Diana Lin

(57) ABSTRACT

In variants, a method for asset generation can include: determining campaign settings, determining recipient data, determining a digital asset template, mapping variables between the digital asset template and the recipient data, optionally generating a set of example digital assets, rendering a set of digital assets, optionally printing a physical version of each digital asset, optionally delivering the physical assets. However, the method can additionally or alternatively include any other suitable elements.

19 Claims, 24 Drawing Sheets

(56) References Cited

OTHER PUBLICATIONS

"Get A Direct Mail Template Proof In the Postalytics Editor", Postalytics, first downloaded Feb. 21, 2023, https://www.postalytics.com/support/documentation/home/direct-mail-creative-templates/generate-a- direct-mail-template-proof/#h-get-a-direct-mail-template-proof-in-the-postalytics-editor.

"Insert Variable Data Fields Into a Postalytics Template", Postalytics, first downloaded Feb. 21, 2023, https://www.postalytics.com/support/documentation/home/direct-mail-creative- templates/personalization-variable-data/#h-insert-variable-data-fields-into-a-postalytics-template.

"Insert Variable Logic Statements for Easy Template Personalization", Postalytics, first downloaded Feb. 21, 2023, https://support.postalytics.com/support/solutions/articles/70000600485-personalization-variable-logic.

"Online QR Code Generator for Direct Mail", Postalytics, first downloaded Feb. 21, 2023, https://www.postalytics.com/tools/online-qr-code-generator/.

Kelly, Dennis , "Better Digital Proofs for Direct Mail—Postalytics Update", Postalytics, Aug. 8, 2019, https://www.postalytics.com/blog/better-digital-proofs-for-direct-mail/.

\* cited by examiner

Lob

Q Getting started? Search any log, letter, postcard, etc...    Help Center ⓘ    User1

- ⌂ Overview
- ᴨᴸ Mail Analytics
- ✎ Address Book
- ⬚ HTML Templates
- ⌖ Address Verification ▾
- ✉ Print & Mail ▾
  - Mail Campaigns
  - Postcards
  - Letters
  - Checks
  - Bank Accounts
  - Webhooks
- </> API Requests
- ⚙ Settings ✉ Print & Mail > Mail Campaigns

Mail Campaigns

Quickly send mail in bulk by uploading a list of recipients.

[ + Create Campaign ]

Campaigns  ⌀ Drafts

[ Filter ]

| Status | Description | Date Created | Schedule | Deliverability | |
|---|---|---|---|---|---|
| ◯ Processing... 40% complete | Holiday Greeting Cards 1000 rows | Oct 4, 2020 12:53 pm UTC | Target Delivery Date Dec 1, 2020 | 60% deliverable | > |
| ◯ Processing... 80% complete | Black Friday Postcards 2000 rows | Oct 4, 2020 11:22 am UTC | ASAP | 82% deliverable | > |
| ⊙ Scheduled Cancel until Oct 2, 2020 | Halloween Ads 1500 rows | Oct 1, 2020 12:53 pm UTC | Target Delivery Date Oct 16, 2020 | 70% deliverable | > |
| ⊙ Finished | Fall Campaign | Sept 24, 2020 | ASAP | 95% deliverable | > |
| ⊗ Cancelled | Back to School 1500 rows | Augt 6, 2020 12:53 pm UTC | Target Delivery Date Sep 1, 2020 | 40% deliverable | > |
| ⊙ Finished | Acquisition 3000 rows | Aug 1, 2020 11:22 am UTC | ASAP | 80% deliverable | > |
| ⊗ Expired | Mid Summer Marketing 7500 rows | July 7, 2020 12:53 pm UTC | ASAP | 40% deliverable | > |
| ⊙ Finished | Start of Summer Campa... 10,000 rows | May 10, 2020 11:22 am UTC | Target Delivery Date May 20, 2020 | 60% deliverable | > |

8 Results

```html
<html>
<head>
<meta charset="UTF-8">
<link href='https://fonts.googleapis.com/css?family=...' rel='stylesheet' type='text/css'>
<title>Lob.com Address Verification 4x6 Postcard Template Front</title>
<style>

*, *:before, *:after {
-webkit-box-sizing: border-box;
-moz-box-sizing: border-box;
box-sizing: border-box;
} body {
width: 6.25in;
height: 4.25in;
margin: 0;
padding: 0;
/* your background image should have dimensions of 1875x1275 pixels. */
background-image: url('IMAGE_URL');
background-size: 6.25in 4.25in;
background-repeat: no-repeat;
}

/* do not put text outside of the safe area */
#safe-area {
position: absolute;
width: 5.875in;
height: 3.875in;
left: 0.1875in;
top: 0.1875in;
text-align: center;
} logo {
height: 1in;
position: relative;
top: .9in;
} tagline {
position: relative;
top: 1in;
font-family: 'FONT';
font-weight: 700;
font-size: .16in;
text-transform: uppercase;
letter-spacing: .03in;
color: white;
border-top: 1px solid white;
padding-top: .15in;
width: 4in;
margin: auto;
}
```

FIGURE 10

METHOD AND SYSTEM FOR ASSET GENERATION

CROSS-REFERENCE TO RELATED APPLICATIONS

This application claims the benefit of U.S. Provisional Application No. 63/326,728 filed 1 Apr. 2022 and U.S. Provisional Application No. 63/336,106 filed 28 Apr. 2022, each of which is incorporated in its entirety by this reference.

TECHNICAL FIELD

This invention relates generally to the mailing services field, and more specifically to a new and useful method for asset generation.

BRIEF DESCRIPTION OF THE FIGURES

FIG. 3 is an illustrative example of multiple mail campaigns.

FIG. 10 is an illustrative example of an HTML template.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
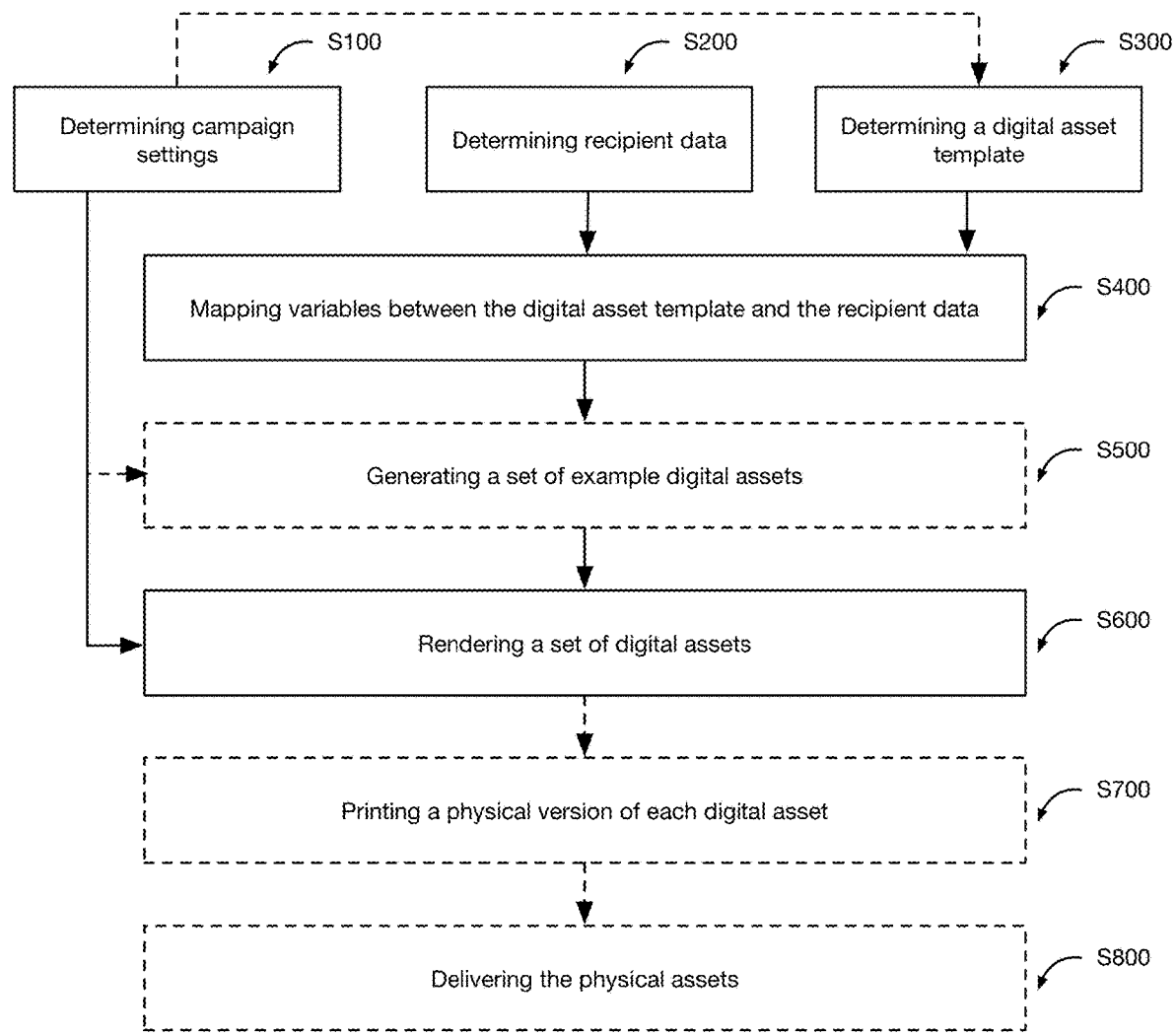
FIG. 1 is a flowchart representation of the method.

As shown in FIG. 1, the method for asset generation can include: determining campaign settings S100, determining recipient data S200, determining a digital asset template S300, mapping variables between the digital asset template and the recipient data S400, optionally generating a set of example digital assets S500, rendering a set of digital assets S600, optionally printing a physical version of each digital asset S700, optionally delivering the physical assets S800. However, the method can additionally or alternatively include any other suitable elements.

The method functions to render digital assets based on campaign settings, recipient data, and a digital asset template to be routed to and printed by one or more print partners. However, the method can provide any other suitable function.

2. Examples

Figure 2:
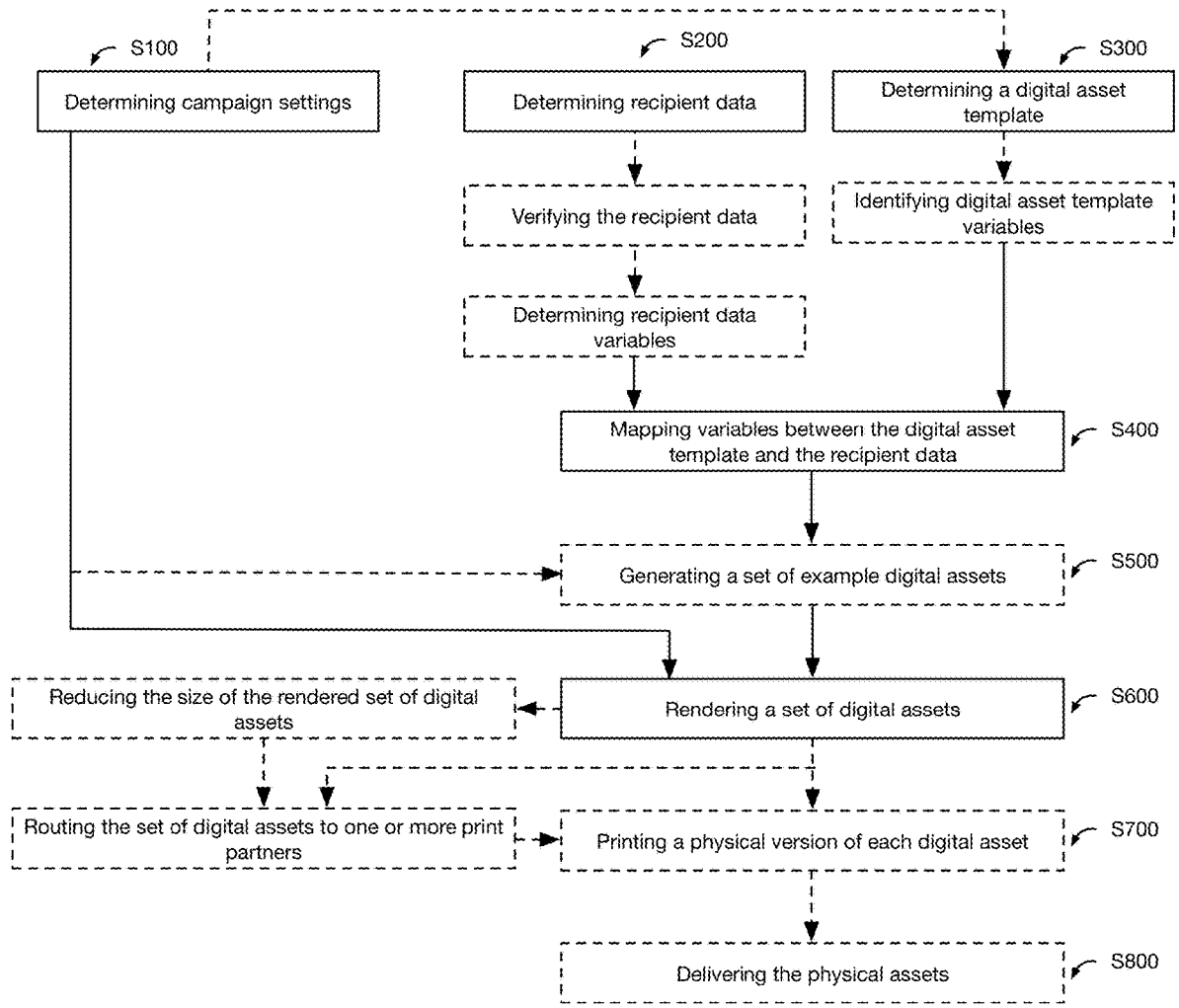
FIG. 2 is an illustrative example of a variant of the method.

In an illustrative example, the method can include: receiving campaign settings (e.g., name of campaign, type of campaign, sender address, postage type, campaign submission date, etc.) from a user via an interface; receiving recipient data (e.g., a CSV file, a path to a database, etc.) from a user via the interface, and optionally storing the recipient data in a database; optionally automatically verifying the recipient data (e.g., using models to determine whether addresses are spelled correctly and/or exist); determining a digital asset template (e.g., via a user selection or provided by a user through an interface), wherein the digital asset template includes rendering instructions for each of a set of graphical regions and/or layers; identifying variables within the digital asset template; mapping variables between the digital asset template and the recipient data (e.g., automatically or received from the user); rendering a set of digital assets based on the campaign settings, the digital asset template, the recipient data, and the mapping between the digital asset template variables and the recipient data variables; optionally routing the set of digital assets to one or more print partners; optionally printing a physical version of each digital asset by one or more print partners; and delivering the physical assets by one or more delivery services (e.g., USPS, FedEx, etc.); example shown in FIG. 2.

However, the method can be otherwise performed.

3. Technical Advantages

Variants of the technology for asset generation can confer several benefits over conventional systems.

First, variants of the technology can enable codeless bulk mail generation (e.g., without using an API). This can enable users with limited to no coding background (e.g., marketers, creatives, etc.) to programmatically define bulk mail pieces and send large volume mail campaigns in a self-serve and facile manner. In variants, the user can select mail campaign settings on an interface 140, upload a recipient data file, and upload a creative template, wherein the system automatically identifies variable fields in the creative template, maps recipient data variables and/or campaign setting variables to the creative template variables, optionally transforms the recipient data values based on a set of rules, and creates personalized digital assets (e.g., mail pieces) for the campaign by populating the creative template variables with the corresponding recipient and/or campaign values. In variants, this can be done without the user entering any lines of code. For example, the creative template can define graphical layers and graphical regions, wherein the graphical elements are associated with creative template variables and subsequently populated with the corresponding recipient data variable values.

Second, variants of the technology can also automatically identify and provide users with proofs of edge case permutations (e.g., when the name of a recipient is too long to fit in a region of a mail piece, when text does not show up due to contrast errors, when the image resolution is too low, when the image dimensions will not fit, etc.). This can allow users to double check possible errors (e.g., spelling, formatting, etc.) prior to rendering the digital mail pieces to be printed.

Third, variants of the technology can enable out-of-band communication with the recipients. For example, variants of the technology can automatically generate a URI (e.g., URL) that is specific to the campaign or the recipient and render a representation of the URI within the digital assets (e.g., as a QR code, etc.). The URI can point to a resource that provides an out-of-band communication with the recipient when accessed, and can also generate campaign metadata (e.g., number of physical asset conversions, number of URI conversions, duration between physical asset receipt and scanning, number of scans, etc.) for the campaign.

However, the technology can confer any other suitable benefits.

4. System

Figure 20:
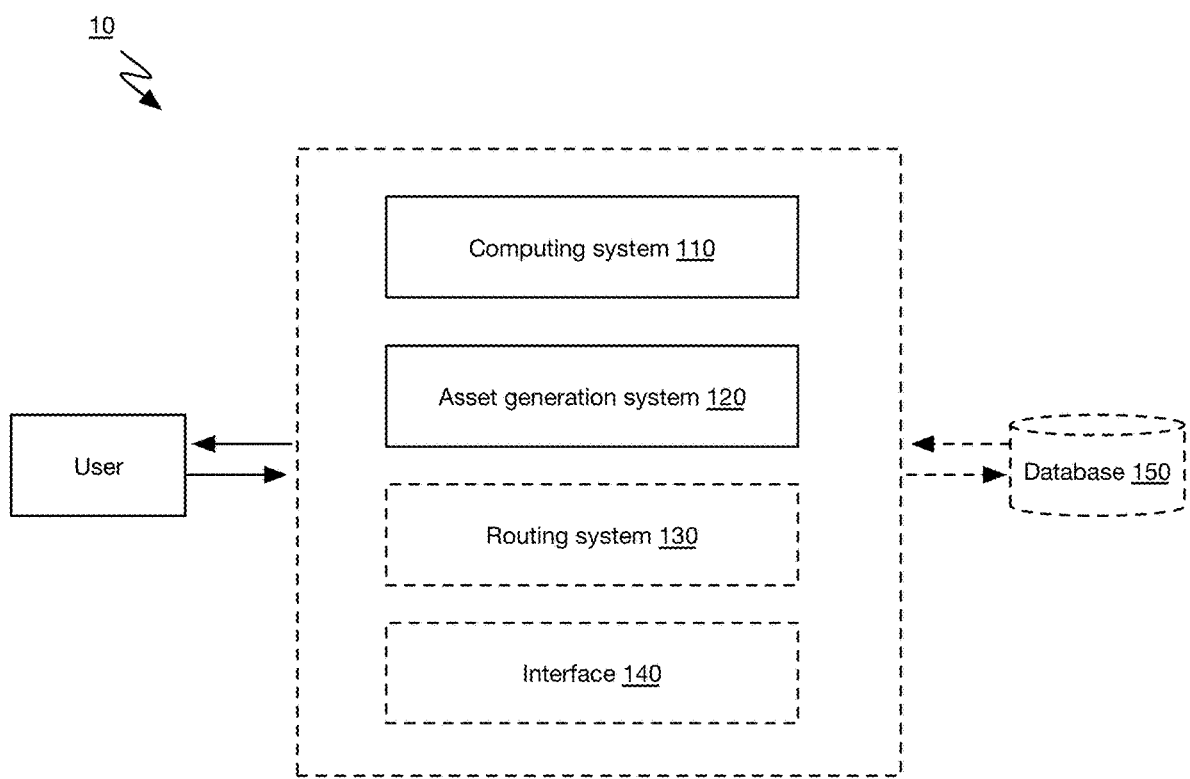
FIG. 20 is a schematic representation of a variant of the system.

The method is preferably performed using a system 10 (example shown in FIG. 20), including: one or more computing systems 110, one or more asset generation systems 120, optionally one or more routing systems 130, optionally one or more interfaces 140, optionally one or more databases 150, and/or any other suitable components. However, the method can additionally and/or alternatively be performed using any other suitable system. The system 10 functions to render digital assets based on campaign settings, recipient data (RD), and a digital asset template (DAT). However, the system can provide any other suitable function.

The system 10 preferably renders multiple digital assets from one or more senders, but can additionally and/or alternatively render one digital asset from one sender, and/or render any other number of digital assets for any set of senders. Each digital asset can be addressed to one recipient, multiple recipients, and/or any other suitable number of recipients. Different digital assets are preferably addressed to different recipients, but can alternatively be addressed to the same recipient. Each digital asset can be unique (e.g., each digital asset can have different combination of asset parameter values, images, text, and/or otherwise differ from other assets, etc.), but can additionally and/or alternatively be generic and/or non-unique (e.g., digital assets have the same asset parameter values, have the same images, etc.), and/or be otherwise related. Each digital asset can be personalized to a specific recipient (e.g., digital asset can have the recipient's full name, digital asset can have a personalized URL, etc.) or not be personalized to a specific recipient.

Each digital asset is preferably a press ready proof (e.g., ready for print), but can additionally and/or alternatively be proof parameters, the raw constituent components of a proof, and/or have any other suitable format. The proof can be represented: as a PDF, in HTML, as an image (e.g., PNG, JPG, etc.), in InDesign (e.g., INDD) and/or any other suitable digital format.

Each digital asset is preferably associated with a set of asset parameters (e.g., metadata), which can include: asset type (e.g., postcards, self mailers, letters, checks, etc.), perforation, color (e.g., color and/or black and white; a specific color; etc.), asset size (e.g., dimensions such as width and/or length; number of sheets; etc.), asset shape, envelope inclusion, and/or other suitable asset parameters. Each digital asset in a campaign is preferably associated with the same set of asset parameter values, but can alternatively be associated with different asset parameter values (e.g., wherein the digital asset-specific parameter values can be defined by the recipient data, the campaign settings, or otherwise defined). The asset can also be associated with mailing parameters, such as priority (e.g., first class, standard, etc.), target mailing date, target delivery date, delivery geolocation (e.g., address, zip code, etc.), and/or any other suitable mailing parameters.

However, digital assets can be otherwise configured.

The system 10 and/or method can be used with: one or more third-party services and/or any other suitable entity. The third-party services are preferably operable during production days (e.g., Monday through Friday) and/or any other suitable days of the week. Third-party services can include: print partners, delivery services, and/or any other suitable party.

The third-party services can include a print partner that functions to generate physical versions of digital assets (e.g., physical assets). The system 10 preferably interfaces with a plurality of print partners, but can additionally or alternatively interface with a single print partner.

Each print partner can be associated with a set of print capabilities. A print capability can specify whether the print partner is capable of printing mail with a certain asset parameter value (e.g., attribute value, etc.). Asset parameters can include: type (e.g., postcards, self mailers, letters, checks, etc.), perforation, color (e.g., color and/or black and white; a specific color; etc.), size (e.g., dimensions such as width and/or length; number of sheets; etc.), shape, and/or any other physical and/or visual asset attribute. A combination of asset parameter values (e.g., color self mailer with a card affixed) can be referred to as an asset parameter permutation, wherein different print partners can be capable of printing different asset parameter permutations, based on their printing capabilities. For example, a print partner associated with certain capabilities can print certain asset parameter permutations, but cannot print other asset parameter permutations. Each print partner can have one or more machines, wherein each machine can have one or more configurations, and/or otherwise be configured. Each configuration can have the same print capabilities or different print capabilities. Different print partners can have different machines with different configurability, and therefore be associated with different capabilities.

Each print partner can be associated with a capacity. The capacity is preferably an overall digital asset volume for a given timeframe, but can alternatively be a digital asset rate and/or be any other capacity. The capacity is preferably a maximum limit, but can additionally and/or alternatively be a minimum and/or or any other limit. The capacity can be associated with: the print capability (e.g., the asset parameter permutation), the machines, and/or otherwise determined. Capacities can vary per print partner: annually, quarterly, monthly, daily, hourly, by the minute, and/or any other suitable time interval.

The third-party services can include a delivery service (e.g., carrier service, such as USPS, Royal Mail, FedEx, UPS, etc.) that functions to receive physical assets (e.g., from one or more print partners) and deliver the physical assets to recipients. The system 10 preferably interfaces with a plurality of delivery services, but can additionally or alternatively interface with a single delivery service. Each delivery service can be associated with a set of delivery service parameters, such as minimum batch volume, maximum batch volume, mail batch parameters, pickup times, cost, speed, associated print partners, and/or any other suitable parameter. The delivery service parameters can be: globally applicable, applicable to a route, a geographic region, a timeframe, and/or otherwise limited.

However, the third-party services can additionally and/or alternatively include any other suitable elements.

The system 10 can include one or more computing systems 110, which can function to execute one or more modules of the system 10. The computing system 110 is preferably a remote computing system (e.g., a platform, a server system, etc.), but can additionally and/or alternatively be performed by a distributed computing system, a local computing system, a centralized computing system, and/or any be otherwise configured. The computing system 110 can execute the asset generation system 120, portions thereof, the routing system 130, and/or any other suitable component.

However, the one or more computing systems 110 can be otherwise configured.

The system 10 can include one or more asset generation systems 120, which can function to perform one or more elements of the method.

The asset generation system 120 can include one or more modules. The modules can include any number of the following modules, arranged in any suitable order. The modules can include: a variable mapping module, a proofing module, a rendering module, and/or any other suitable module.

The modules can include a variable mapping module, which can function to map DAT variables to RD variables, campaign setting variables, and/or variables from any other suitable data source. The variable mapping module can include: a variable mapping model (e.g., etc.), a drag-and-drop interface (e.g., wherein a user can drag RD variable names into graphical regions on the DAT), and/or any other suitable component for mapping the variables. Examples of variable mapping models that can be used include: a naïve algorithm to detect matching variable strings and/or variable identifiers, a regular expressions set, an explicit ruleset, a model trained to match semantic meaning between the variable names, a model trained to detect patterns in the variable values and match the variables based on the patterns, and/or other models. The variables (e.g., DAT variables, RD variables, campaign variables, etc.) can have one-to-one mapping, many-to-one mapping, many-to-many mapping, and/or have any other suitable mapping. However, the variable mapping module can be otherwise configured.

The modules can include a proofing module, which can function to generate example digital assets to a user prior to bulk rendering to check for errors. The proofing module can include: identifying representative RD values (e.g., edge cases, high frequency RD values, etc.), rendering proofs of the representative RD values (e.g., using the RD values for a recipient having the representative RD value; using representative RD values from different recipients; etc.), determining unique permutations, rendering proofs of unique permutations, highlighting edge cases in a proof, recommending solutions for the errors, automatically fixing the errors, generating a notification related to the proofs, and/or perform any other suitable proofing. The proofing module can generate a set of example digital assets based on: a user's proofing preferences, a set of proofing rules, other campaign settings, and/or any other suitable information. However, the proofing module can be otherwise configured.

The modules can include a rendering module, which can function to render digital assets based on the RD, a DAT, and optionally campaign settings. The rendering module can include: populating a DAT region with a visual asset associated with the DAT variable for the region, wherein the visual asset value is the corresponding RD variable's value or the corresponding campaign settings variable's value; optionally adjusting the rendered visual assets (e.g., scaling the visual asset; adjusting the kerning; adjusting the visual asset's saturation, contrast, or other visual parameter; etc.), adjusting the size of the resultant digital asset, and/or any perform any other suitable rendering. However, the rendering module can be otherwise configured.

However, the one or more asset generation systems 120 can be otherwise configured.

The system 10 can optionally include one or more routing systems 130, which can function to determine a print partner for a digital asset, but can additionally and/or alternatively determine a prioritized list (e.g., with weighted priority) of print partners, and/or have any other suitable function. The routing system 130 can be accessible via one or more APIs, be inaccessible to a user, or be otherwise accessible. The digital assets from a campaign can be routed to the print partners for printing (e.g., physical asset generation) based on print partner collocation with the recipient address (e.g., location within a shared geographic region); using an optimization (e.g., over cost, delivery speed, capacity, minimum volume satisfaction, etc.); and/or otherwise routed. In variants, the routing system 130 can be a routing system as discussed in U.S. application Ser. No. 17/540,521 filed 2 Dec. 2021, which is incorporated in its entirety by this reference. The digital assets from a campaign can be routed to the same print partner or to different print partners.

However, the one or more routing systems 130 can be otherwise configured.

The system 10 can optionally include one or more interfaces 140, which can function to receive from and/or present information to a user. For example, the interface 140 can: receive the RD, receive the campaign settings, receive the DAT, present proofs (e.g., representative proofs, edge case proofs, etc.), present campaign information (e.g., cost, print partners, asset print or delivery state, campaign metadata, etc.), and/or present or receive any other suitable information. The interface 140 is preferably a graphical user interface (example shown in FIG. 3), but can additionally and/or alternatively be a command line interface, an application programming interface (API), a touch user interface, a voice user interface, and/or any other suitable type of interface. The interface 140 is preferably an application (e.g., browser application, native application, etc.) on a user device (e.g., laptop, desktop, mobile phone, tablet, etc.), but can additionally and/or alternatively be an API, and/or any other suitable interface. The user input and/or user selection is preferably tactile based (e.g., pressing a digital button, dragging & dropping, etc.), but can additionally and/or alternatively be voice-based, motion-based, and/or any other suitable user input and/or user selection.

However, the one or more interfaces 140 can be otherwise configured.

The system 10 can optionally include one or more databases 150, which can function to store queryable data (e.g., from users) such as information received from a user (e.g., campaign settings, RD, DATs, etc.); information determined by the method (e.g., example digital assets, rendered digital assets, mapped variables, etc.); information retrieved from a print partner (e.g., using an API call, downloaded, etc.); any/or any other suitable information. The databases 150 can include one or more: font databases, visual asset databases, color databases, campaign settings databases, RD databases, DAT databases, digital asset databases, example digital asset databases, print partner databases, delivery service databases, and/or any other suitable database. The database 150 can be a NoSQL database, a relational database (RDS), a hierarchical database, a distributed database, a centralized database, a cloud database, and/or any other suitable database. The data stored in the databases 150 can be determined automatically (e.g., via APIs, through an interface 140 such as a graphical user interface, etc.), manually (e.g., by an administrator), and/or otherwise determined.

However, the one or more databases 150 can be otherwise configured.

5. Method

The method can include: determining campaign settings S100, determining recipient data S200, determining a digital asset template S300, mapping variables between the digital asset template and the recipient data S400, optionally generating a set of example digital assets S500, rendering a set of digital assets S600, optionally printing a physical version of each digital asset S700, optionally delivering the physical assets S800, and/or any other suitable elements. One or more instances of the method can be repeated for one or more mail campaigns (e.g., example shown in FIG. 3), campaign settings, RD, DATs, variables, timeframes, and/or otherwise repeated. All or portions of the method can be performed continuously, recurrently (e.g., daily, hourly, etc.), upon receipt of a request (e.g., a campaign request), and/or at any other time and/or frequency. The method is preferably performed without any user-entered lines of code, but can alternatively be performed with user-entered lines of code (e.g., when the digital template is in a HTML format, for variable mapping, etc.).

The method is preferably performed by the system 10 disclosed above, but can additionally and/or alternatively be performed by any other suitable system.

5.1. Determining Campaign Settings S100.

Determining campaign settings S100 functions to determine one or more settings for a mail campaign. S100 can be performed before S200, concurrently with S200, concurrently with S300, after S200, and/or at any other suitable time. The campaign settings can be used to determine: when the mail pieces should be printed, how the mail pieces should be printed, when the mail pieces should be mailed, values for DAT variable population, and/or otherwise used. Campaign settings can include: name of campaign, description of campaign, type of campaign (e.g., marketing campaign, transactional campaign, etc.), the trigger for the campaign (e.g., upon ordering the campaign), whether the campaign is event-based, sender address (e.g., default sender address), campaign entity (e.g., the sender, the marketing agency controlling the campaign, the company that the campaign is advertising for, etc.), campaign schedule (e.g., mail pieces delivered on or by a target delivery date; mail pieces delivered as soon as possible; etc.), postage type (e.g., standard mail, first class mail, etc.), campaign submission date, target mailing date, target delivery date, a URI (e.g., a destination URL, a campaign URL, etc.) or other reference identifier referencing a referenced resource (e.g., a website, a coupon, a form, etc.), a representation of the reference identifier (e.g., a QR code, a barcode, a non-unique QR code, a unique QR code, etc.), number of mail pieces, type of mail pieces, shape of mail pieces, size of mail pieces, material of mail pieces, campaign cancellation window, proofing preferences (e.g., all unique permutations, randomly selected unique permutations, all edge cases, specific types of edge cases, etc.), asset parameter values (e.g., for all assets in the campaign), and/or any other suitable campaign information.

Figure 8:
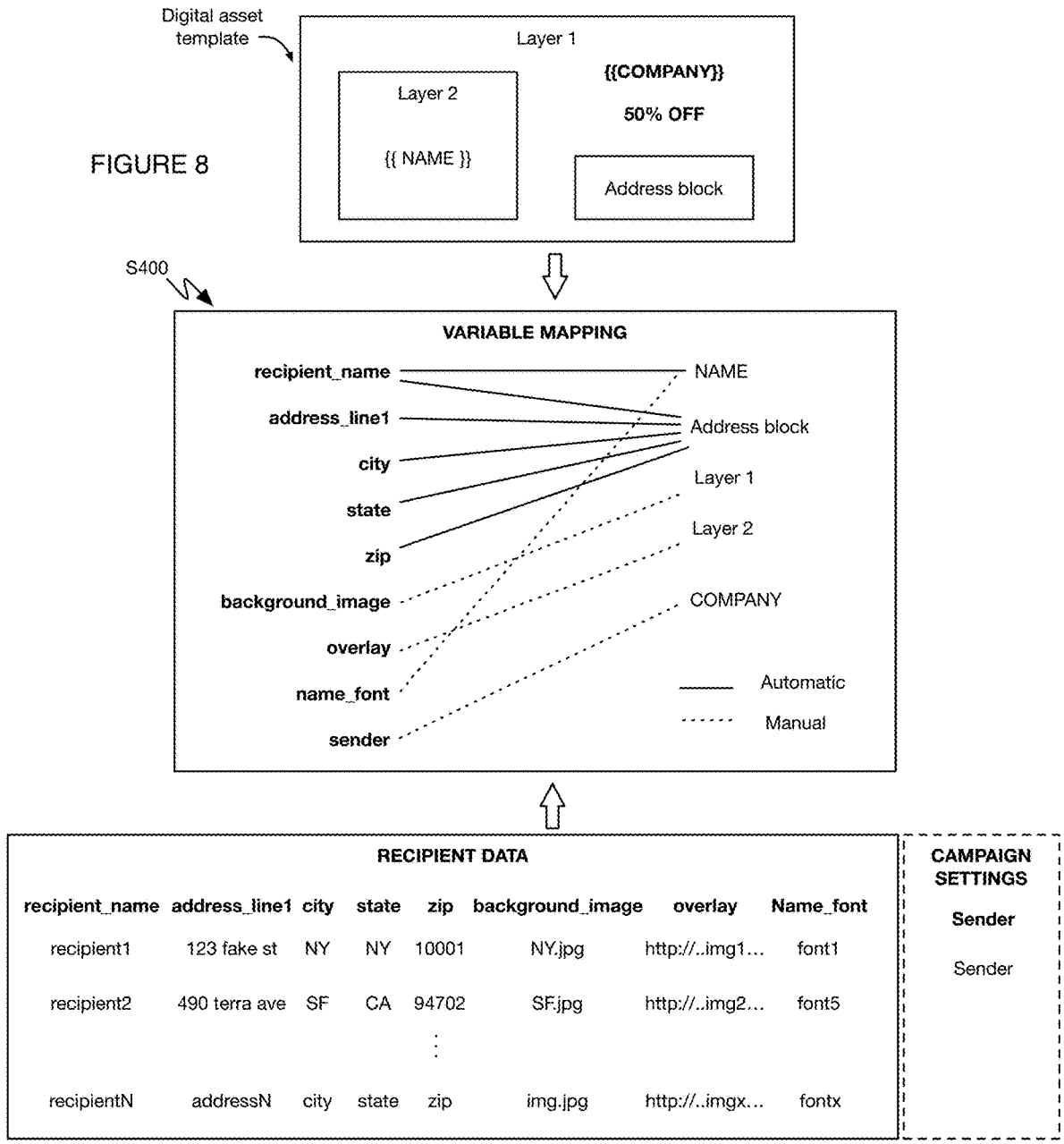
FIG. 8 is a schematic example of a digital asset template, recipient data, and a mapping between the digital asset template variables and the recipient data variables.
Figure 9:
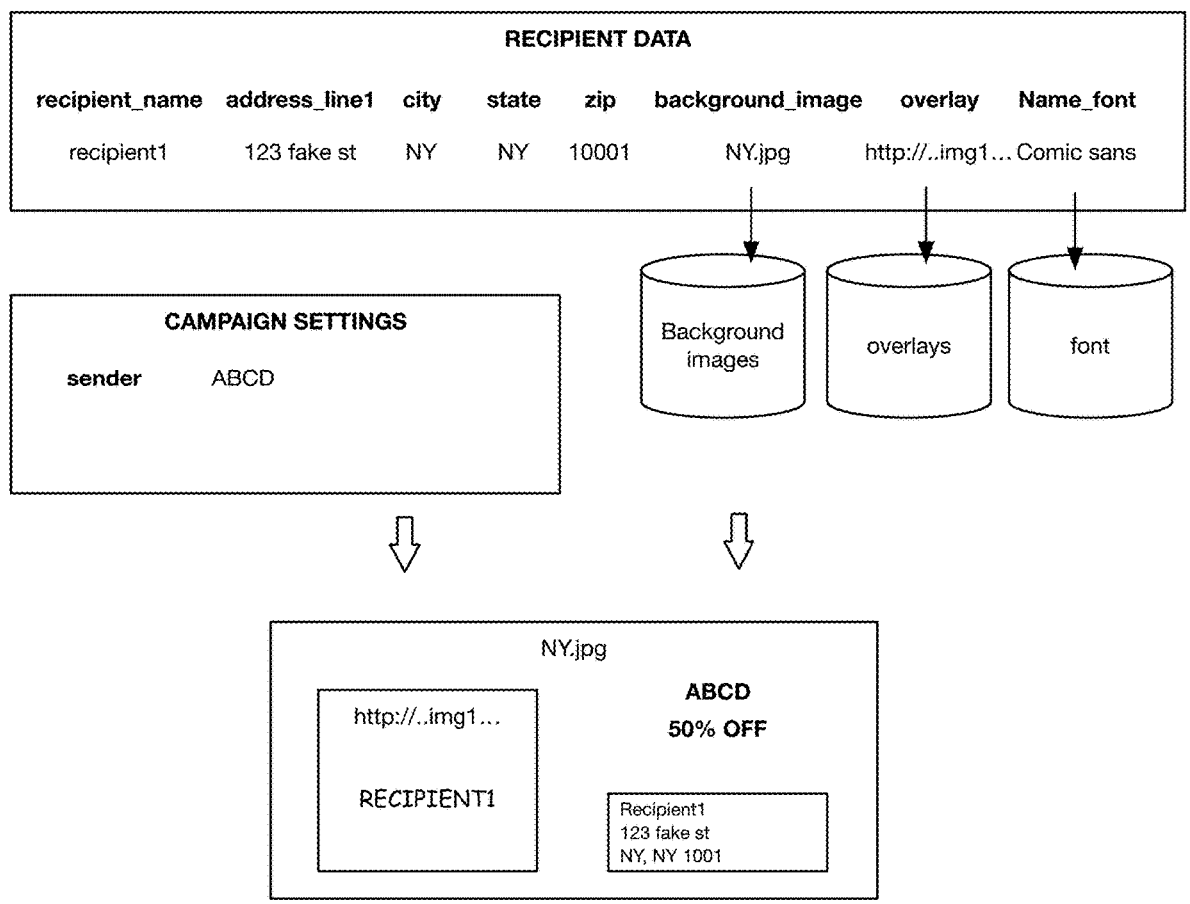
FIG. 9 is an illustrative example of a digital asset rendered based on the digital asset template and the recipient data.

In variants, the campaign settings can be treated as campaign variables. In an example, one or more campaign variables can be mapped to digital asset template (DAT) variables (e.g., as part of or using a similar method as S400, below). Examples are shown in FIG. 8 and FIG. 9.

Figures 4A, 4B:
FIGS. 4A-4B are illustrative examples of determining campaign settings.

The campaign settings are preferably manually determined by a user, but can alternatively be automatically determined. In a first example, a user can determine the campaign settings using an interface 140 with a set of fields (example shown in FIGS. 4A-4B), a question-and-answer workflow, and/or any other suitable user interface. In a second example, the campaign settings can be programmatically determined via API. In a third example, the campaign settings can be automatically determined based on the user account preferences, or based on the campaign settings for past campaigns by the user account. However, the campaign settings can be otherwise determined.

Figure 21:
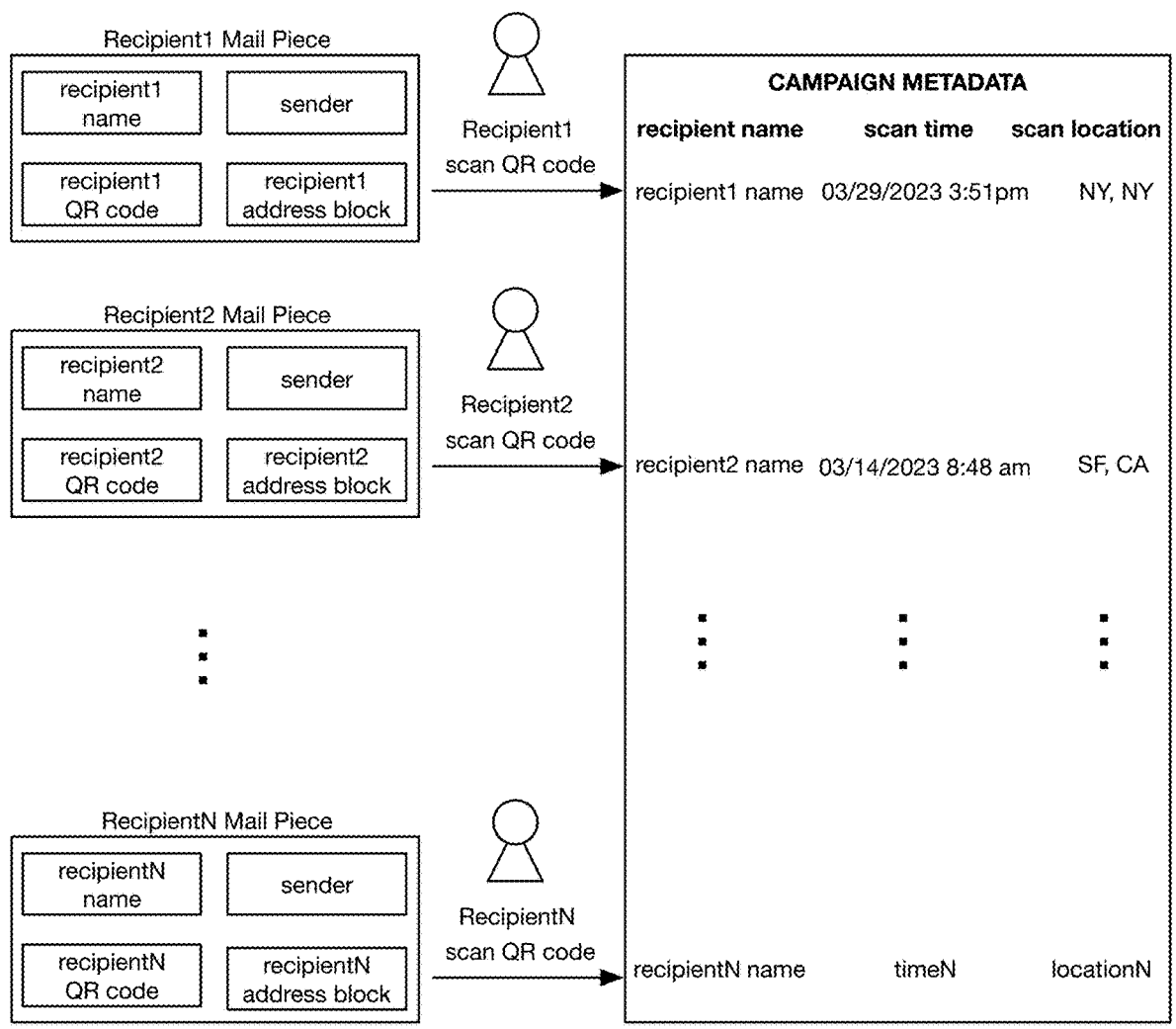
FIG. 21 is an illustrative example of campaign metadata generation based on scanned QR codes specific to recipients.
Figure 22:
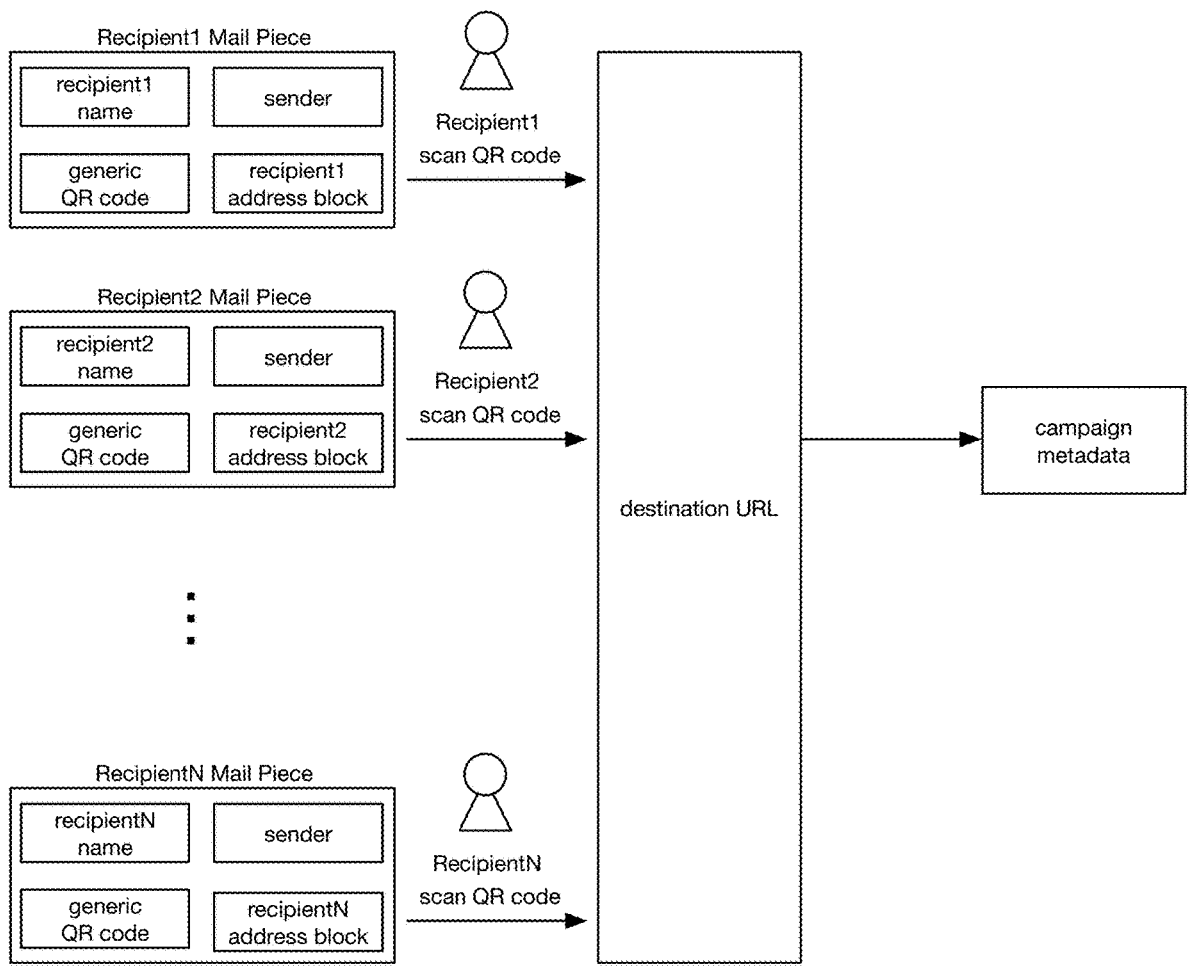
FIG. 22 is an illustrative example of campaign metadata generation based on scanned generic QR codes.

In an illustrative example, a campaign resource representation (e.g., QR code for the campaign URL) can be automatically determined based on the campaign resource identified within the campaign settings. The campaign resource representation can be generic to all mail pieces within the campaign, be specific to the campaign and mail piece combination, be specific to a set of recipients (e.g., recipients sharing a common recipient variable value, etc.), be specific to each recipient, be specific to a set of recipient variable values, and/or otherwise specific or generic. In use, after the physical assets are delivered, a recipient can access the campaign resource. For example, the recipients can scan the QR code, which directs the recipient to a destination URL. When each campaign resource representation is accessed (e.g., scanned), it can map back to the campaign and provide analytics about the physical asset (e.g., campaign metadata; time of scan, location of scan, name of recipient, IP address of recipient's device, recipient-specific variable values associated with the recipient, etc.; examples shown in FIG. 21 and FIG. 22; etc.) and aggregates data about the campaign.

However, the campaign settings can be otherwise determined.

5.2. Determining Recipient Data S200.

Determining recipient data S200 functions to determine data for a set of recipients (e.g., names, addresses, visual assets to use, values to use, etc.) for the mail campaign. S200 can be performed after S100, concurrently with S100, concurrently with S300, before S300, and/or at any other suitable time. The recipient data (RD) can include the data for one or more recipients. The RD can be in: a CSV, a text document, a data object (e.g., a JSON object, a YAML object, etc.), a database, and/or in any other suitable data format. The RD is preferably structured data (e.g., tabular data), but can alternatively be unstructured data, a combination thereof, and/or any otherwise structured and/or unstructured. The RD preferably includes a set of recipient data variables (RD variables, merge variables) and variable values for each of a set of recipients (examples shown in FIG. 8 and FIG. 9), but can alternatively be otherwise structured. For example, the RD is a table or database of values wherein the columns represent variables, and the rows represent the variable's value for a recipient. The RD can be uploaded (e.g., into the user interface), accessed or downloaded (e.g., using a link or other resource identifier provided by the user), learned, extracted from past campaigns, and/or otherwise determined.

Figure 16:
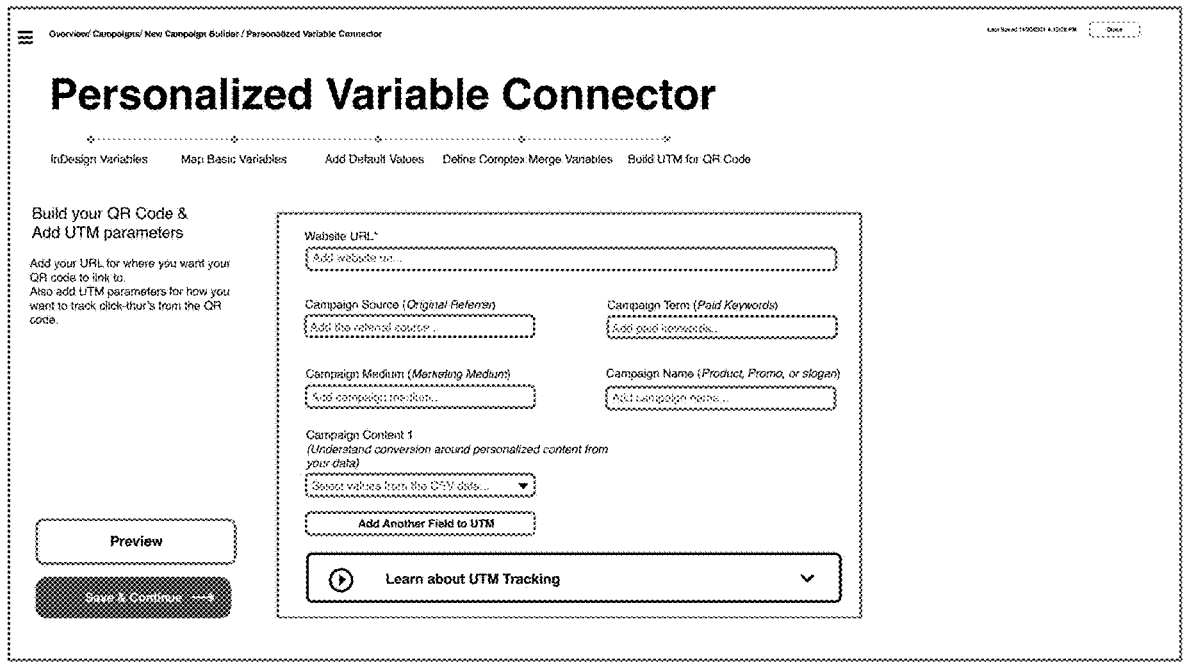
FIG. 16 is an illustrative example of building a QR code based on a URL.

In variants, variables and/or values thereof can be specific to the recipient (e.g., "recipient-specific variables") or shared between recipients (e.g., "non-recipient-specific variables"). Non-recipient-specific variables can have nonunique values within the RD (e.g., multiple recipients can share the same RD variable value), or be otherwise defined. Non-recipient-specific variables can include: visual asset identifier, template identifier, and/or any other suitable variable. Non-recipient-specific variables can be unique to a subset of the recipients or have values that are shared across all recipients in the RD. Recipient-specific variables preferably have (substantially) unique values within the RD (e.g., only one or a small number of recipients share the same RD variable value), or be otherwise defined. Recipient-specific variables can include: unique identifier, first name, last name, full name, email, gender, age, address line (e.g., street name, street number, apartment number, etc.), city, state, zip code, country, recipient-specific campaign URI (e.g., personalized URL), campaign resource identifier (e.g., a unique URI or URL, a unique QR code; a non-unique QR code; example shown in FIG. 16; etc.), and/or any other suitable variable.

The RD preferably includes a variable for each variable appearing in the DAT, but can alternatively include more variables than variables appearing in the DAT, less variables than variables appearing in the DAT, and/or any other suitable number of variables.

Variable values can be and/or reference: alphanumeric (e.g., words, addresses, etc.), one or more databases 150 (e.g., a visual asset identifier, such as a filename or a URI; a font database; a visual asset database; a color database, etc.), a visual asset (e.g., an image, a video, etc.), and/or any other suitable value. The order of variables appearing within the RD is preferably predetermined (e.g., prescribed by the system 10, listed on a template, etc.), but can alternatively be unspecified (e.g., wherein the system 10 automatically identifies which row or column contains a given variable).

The RD is preferably manually determined by a user (e.g., using an interface 140, programmatically via API, etc.), but can additionally and/or alternatively be automatically determined (e.g., generating a unique QR code for each recipient).

Figure 5:
FIG. 5 is an illustrative example of uploading recipient data (RD).

In a first variant, S200 can include uploading a file (e.g., a CSV) by a user on an interface 140 and storing the file in a database 150 (e.g., AWS storage); example shown in FIG. 5.

In a second variant, S200 can include selecting an existing file by a user that is stored in a database 150.

In a third variant, S200 can include receiving RD programmatically via API from a user.

In a fourth variant, S200 can include automatically generating RD after a user chooses to purchase RD.

However, the RD can be otherwise determined.

Figure 14:
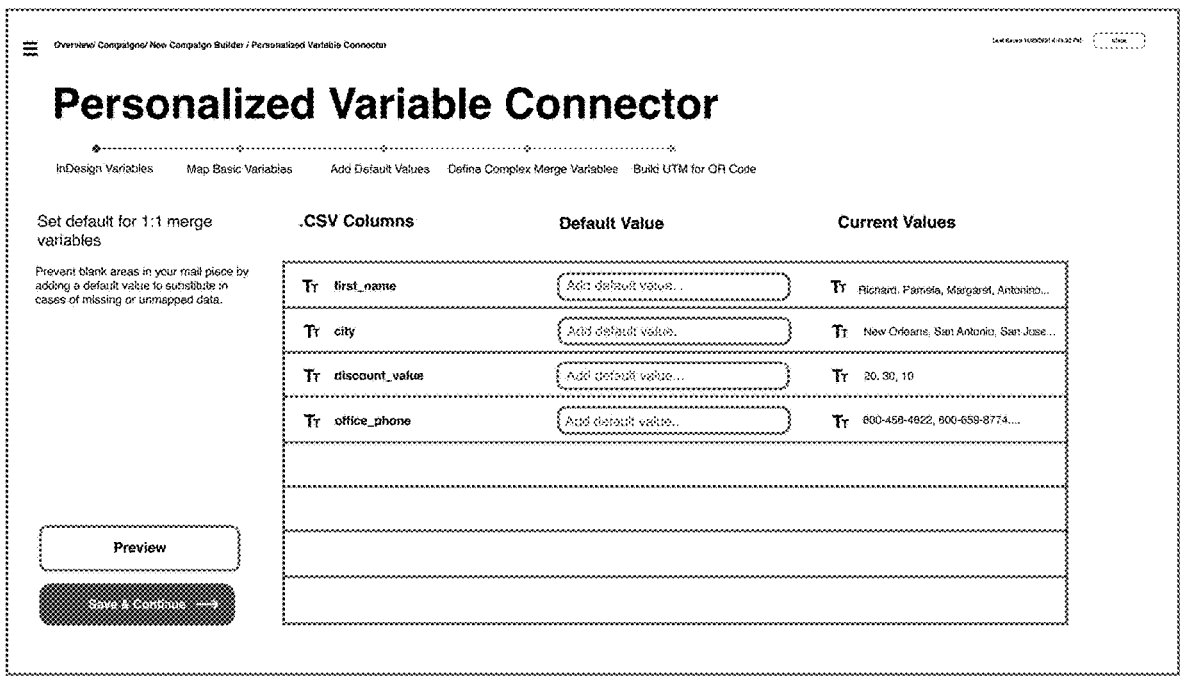
FIG. 14 is an illustrative example of setting default values for missing and/or unmapped values in the recipient data.
Figure 23:
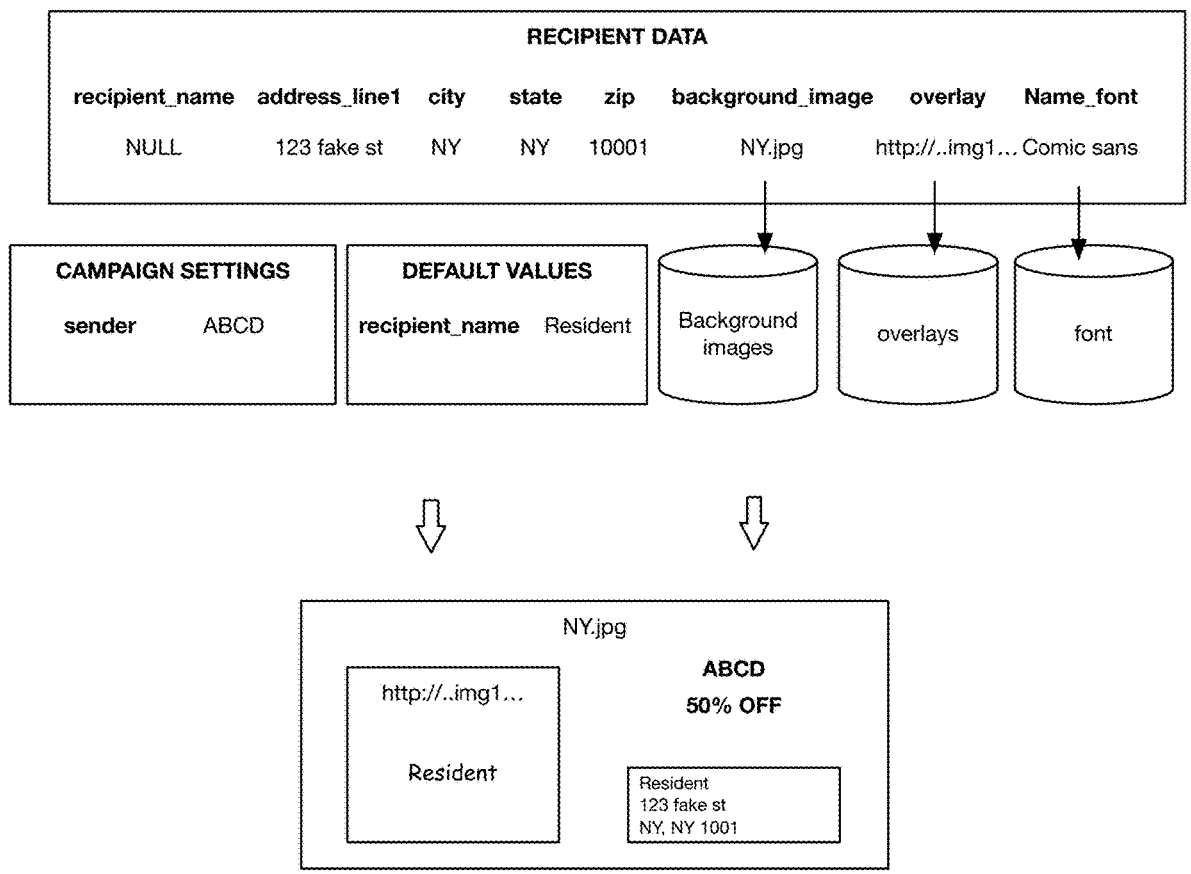
FIG. 23 is an illustrative example of a digital asset rendered based on the default value, the digital asset template, and the recipient data.

S200 can optionally include setting default values for missing and/or unmapped values in the RD (e.g., such that recipients with missing and/or unmapped values have digital assets rendered using the default values); example shown in FIG. 14. The default values for a RD variable can be determined manually (e.g., specified by a user on an interface 140) or automatically (e.g., using a model). For example, if a variable value for a recipient is missing (e.g., the variable value is NULL and/or is empty), the missing variable value for the recipient is set to a specified default value. In a first illustrative example, if the name variable value for a recipient is NULL and/or is empty, the name variable value for the recipient is set to "Resident" in the RD (example shown in FIG. 23). In a second illustrative example, recipients can have a visual asset value of a landmark within a city (e.g., an image of the Golden Gate Bridge). If the visual asset value for a recipient is NULL and/or is empty, the visual asset value is set to an image that is generic among cities (e.g., an image that represents the entire country such as a flag, a map of the country, etc.).

S200 can optionally include determining recipient data variables (RD variables). RD variables can be automatically, manually, or otherwise determined. In a first variation, each column header in the RD is treated as an RD variable. In a second variation, the user manually defines the RD variables (e.g., in an interface 140). In a third variant, each programmatic variable name is treated as an RD variable. However, the RD variables can be otherwise determined.

S200 can optionally include verifying the RD. The RD is preferably verified automatically, but can alternatively be verified manually. RD verification can include: verifying the variable values, identifying outlier values, confirming that the variable names are locally unique, and/or otherwise verifying the RD.

In a first variant, verifying the RD can include verifying values for required variables (e.g., address, visual asset identifier). In a first embodiment, this includes verifying that each recipient has a value for each required variable. When a recipient does not have a value for a required variable, the missing variable value for the recipient can optionally be set to a specified default value, a notification (e.g., error) can be presented to the user, and/or the missing variable can be otherwise handled. In a second embodiment, this includes verifying that each RD variable value is valid (e.g., a deliverable address, etc.). In an example, models can be used to determine whether addresses are spelled correctly and/or exist, such as by using a method described in U.S. application Ser. No. 17/396,570 filed 6 Aug. 2021, which is incorporated in its entirety by this reference.

In a second variant, verifying the RD can include identifying potential errors (e.g., outliers) based on the remainder of the RD. The potential errors can be used to: clean up the recipient data, ensure that the recipient data is accurate, ensure that the recipient variable values can be printed, ensure that physical assets printed using the outlier recipient variable values will be aesthetically acceptable, and/or otherwise used. The potential errors are preferably identified using a model, but can additionally and/or alternatively be identified manually. The model can be and/or include: regressions (e.g., linear models), classification, neural networks (e.g., CNNs, DNNs, etc.), rules, heuristics, equations (e.g., weighted equations, etc.), selection (e.g., from a library), instance-based methods (e.g., nearest neighbor), regularization methods (e.g., ridge regression), decision trees, Bayesian methods (e.g., Naïve Bayes, Markov), kernel methods, probability, deterministics, support vectors, pattern detection methods, anomaly detection models, novelty detection models, distance models (e.g., calculating a distance, such as a Levenshtein distance, between a value for a recipient and the values for remainder of the population), statistical methods (e.g., numeric outliers, expectation-maximization methods, etc.), gaussian methods (e.g., z-score), or any other suitable method. In an example, patterns across recipients (e.g., using a model, such as a machine learning model) are identified and outliers are identified based on the patterns. In a first illustrative example, when majority of recipient addresses in a city (e.g., New York City) are associated with a first visual asset (e.g., an image of the Empire State Building; a specific image identifier, such as "image1"; etc.), any recipient addresses in the city that are not associated with the first visual asset are surfaced for user review. In a second illustrative example, when there are multiple instances of the same recipient (e.g., similar and/or identical name and address) within the RD, these instances are surfaced for user review and the repeated instances can be deleted by the user.

However, the RD can be otherwise verified.

5.3. Determining a Digital Asset Template S300.

Determining a digital asset template S300 functions to determine a digital asset template (DAT) that defines the design of the digital asset. S300 can be performed after S200, concurrently with S100, concurrently with S200, before S400, and/or at any other suitable time. The DAT used with the campaign and/or RD can include one DAT, multiple DATs, and/or any other suitable number of DATs. The DAT to use for a given mail piece can be specified by the campaign settings, manually specified (e.g., uploaded by the user), specified by the RD (e.g., as a value for a DAT variable), and/or otherwise defined. The DAT can be a visual layout specifying the position and/or graphical region associated with each of a set of DAT variables, or alternatively not be a visual layout specifying position. The DAT can be: an HTML template (example shown in FIG. 10), a PDF, a JPEG, a PNG, an InDesign file (e.g., INDD), and/or any other suitable file format. The DAT can be built on the platform (e.g. on an interface 140 of the platform or system), partially built on the platform (e.g., wherein non-personalized or non-variable assets, such as visual assets or text, can be imported as a template, and DAT variables can be added using the platform), received from an external system (e.g., wherein the entire DAT, including the DAT variables, can be received from a third-party system, such as Figma or InDesign), or otherwise received. The DAT can be associated with a form factor (e.g., a postcard, a letter, a letter with add-ons, a self-mailer, etc.), but can alternatively not be associated with a form factor. The form factor is preferably manually selected by a user on an interface 140, but can alternatively be automatically determined (e.g., based on the DAT), be specified by the DAT, and/or otherwise determined.

The DAT is preferably manually determined by a user (e.g., using an interface 140, programmatically via API, etc.), but can alternatively be automatically determined.

In a first variant, S300 can include uploading DAT by a user on an interface 140.

Figure 6:
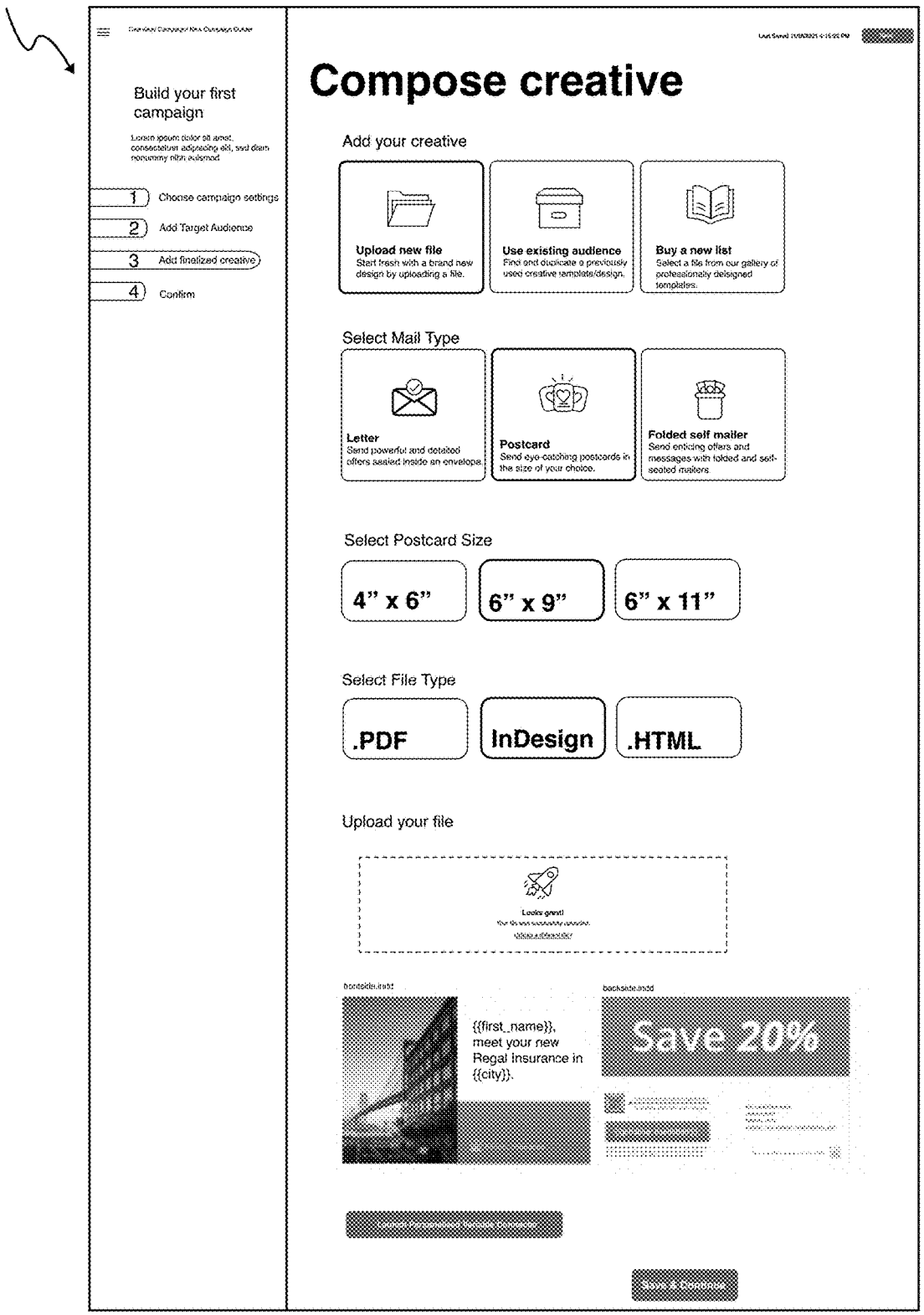
FIG. 6 is an illustrative example of determining a digital asset template (DAT).
Figure 7:
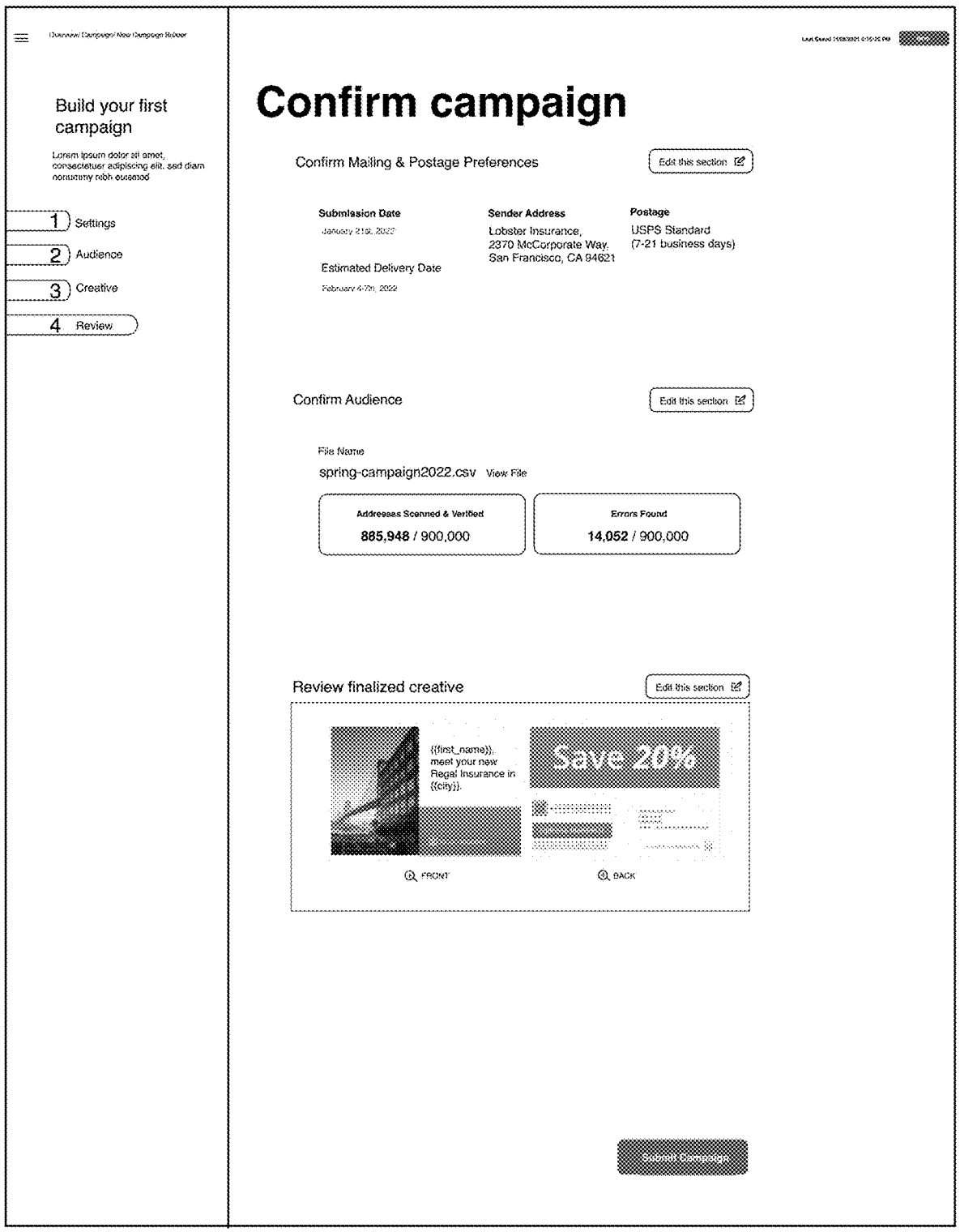
FIG. 7 is an illustrative example of an overview of determined campaign settings, recipient data, and a digital asset template.

In a second variant, S300 can include selecting an existing DAT by a user that is stored in a database 150; example shown in FIG. 6.

In a third variant, S300 can include designing a new DAT by a user on an interface 140 (e.g., by dragging-and-dropping rendering instructions into different regions of a stock template). Rendering instructions can include: RD variable names (e.g., determined from the RD), custom variable names (e.g., specified for the DAT by the user), rendering logic (e.g., if statements, if else statements, etc.), and/or other suitable instructions. The stock template can be for a given form factor (e.g., a postcard, a letter, etc.).

In a fourth variant, S300 can include receiving a DAT programmatically via API from a user. The DAT can be an HTML template, a graphical template, and/or otherwise represented.

In a fifth variant, S300 can include receiving HTML specifying a DAT layout. In this example, the DAT can include a specification that defines the DAT variable associated with each of a set of programmatically defined template regions (e.g., defining width, height, margin, padding, and pixel location); illustrative example shown in FIG. 10.

Figure 11:
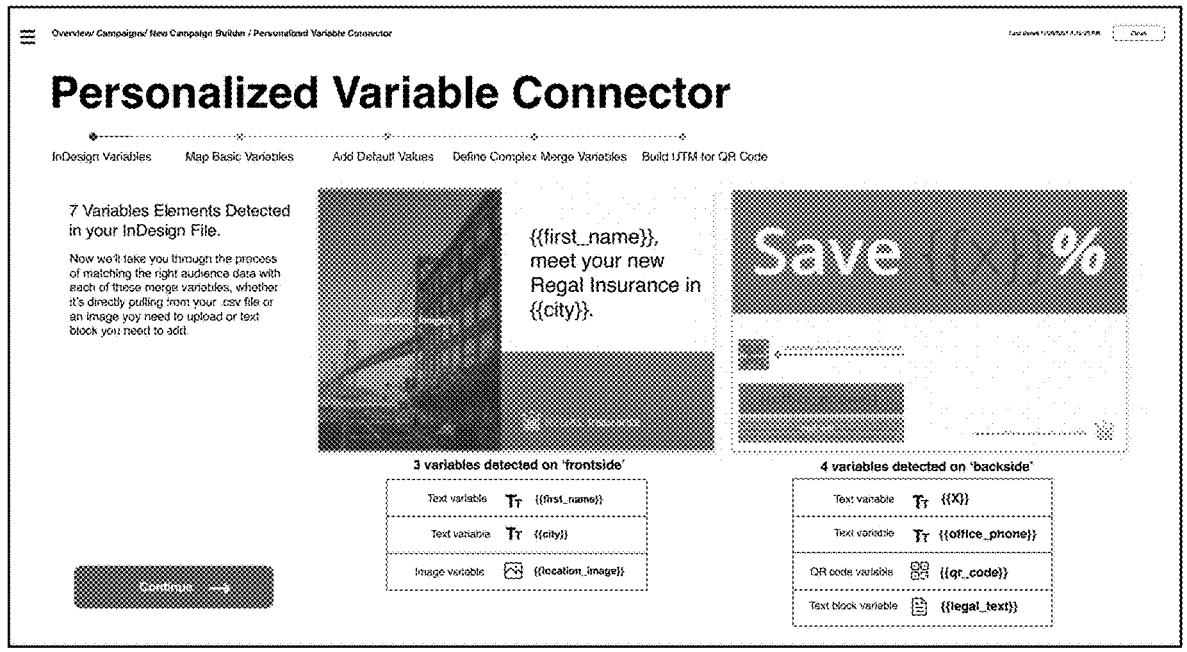
FIG. 11 is an illustrative example of identifying variables within the digital asset template.

In a sixth variant, S300 can include receiving a DAT, including the DAT variables, from an external system (e.g., example shown in FIG. 11). In variants, this can confer better quality control for the final printed products, since a single designer can create and control the holistic design (e.g., a second user, such as a campaign manager, does not need to insert DAT variables using the platform).

However, the DAT can be otherwise determined.

The DAT preferably includes rendering instructions for each of a set of regions (e.g., spatial region on the resultant physical asset) and/or layers, but can alternatively not include rendering instructions for each of a set of regions and/or layers, and/or include and/or not include any other suitable rendering instructions. The size and/or location of the regions can be: predetermined (e.g., from a template), manually determined (e.g., by a user, working off a predetermined template or generating a new DAT, etc.), automatically determined (e.g., based on the values for the RD variable associated with the DAT variable that is associated with the region), and/or otherwise determined. For example, the region size can be determined based on the length of the minimum and/or maximum RD variable value. In another example, the region location can be determined based on a RD variable type (e.g., specified manually, automatically classified, etc.), wherein different RD variable types can be automatically positioned in a predetermined location. However, the region parameters (e.g., size, location, transparency, etc.) on the DAT can be otherwise determined.

Figure 15:
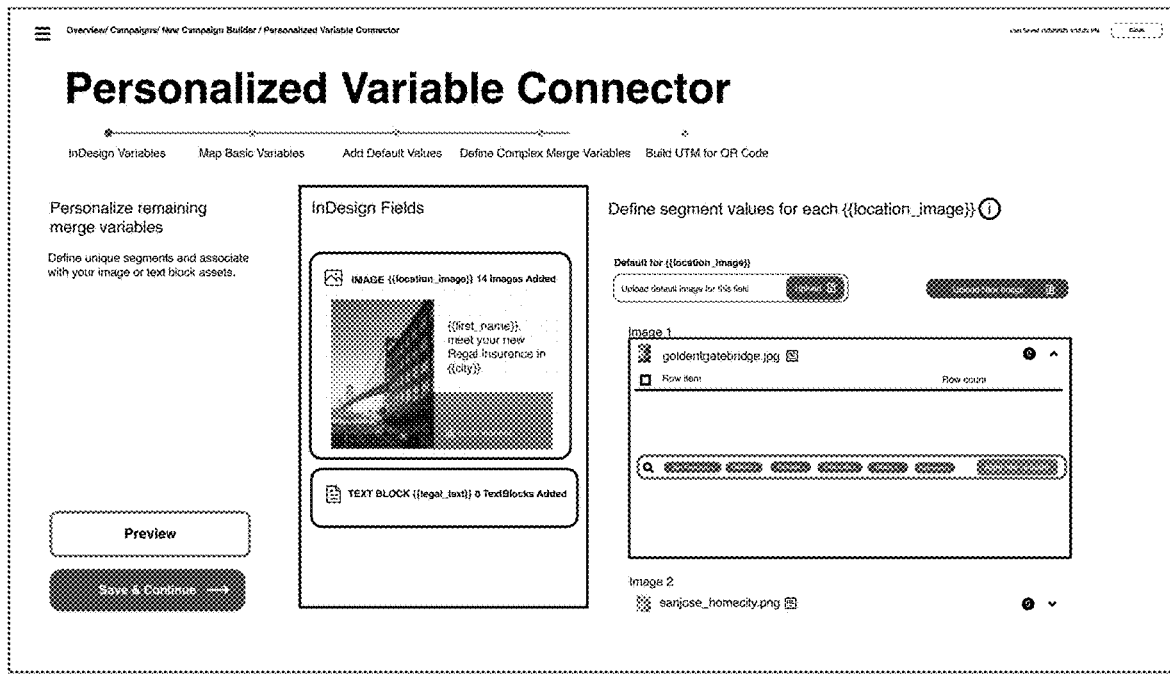
FIG. 15 is an illustrative example of defining visual asset values for a visual asset parameter.
Figure 19:
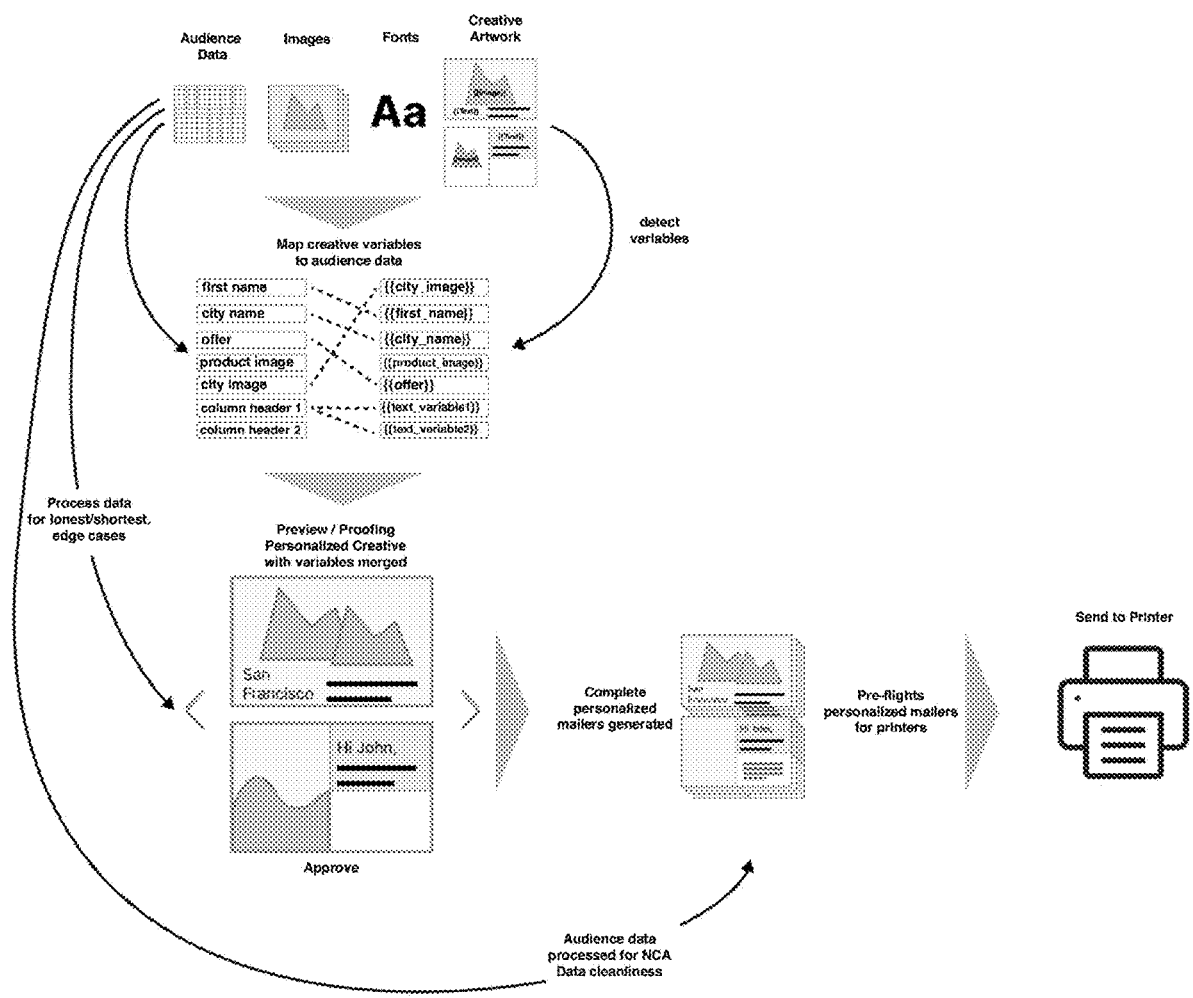
FIG. 19 is an illustrative example of a variant of the method.

In variants, the DAT can include: visual assets (e.g., all digital assets created using the template will have the same visual asset from the template, example shown in FIG. 15), variable indicators, and/or any other suitable rendering instructions. The DAT can additionally and/or alternatively include and/or reference: one or more databases 150 such as a font database (example shown in FIG. 19), a visual asset database (example shown in FIG. 19), a color database, and/or any other suitable database used to populate the DAT. The databases 150 can be: uploaded to the system 10 (e.g., a platform), be owned by the system 10, be identified by a URI, be identified by an API endpoint (e.g., wherein the campaign settings can optionally include an API token, etc.), and/or otherwise determined. The DAT is preferably associated with variables, but can alternatively not be associated with variables (e.g., no personalization). In a first illustrative example, the DAT can include a fixed background image and a set of variables overlaying the background image. In a second illustrative example, the DAT can include a set of layers, each identified by a different variable, and a set of variables overlaying the layers (example shown in FIG. 8). In a third illustrative example, the DAT can include a set of HTML code (example shown in FIG. 10). However, the DAT can be otherwise constructed.

S300 can additionally include identifying variables for the DAT; example shown in FIG. 2. The DAT variables are preferably independently defined and identified from RD variable definition and/or identification (e.g., the DAT variables are not defined based on the RD variables). Alternatively, the DAT variables can be defined based on the RD variables (e.g., wherein the RD variables are identified and surfaced as DAT variables for DAT creation). The DAT variables can be pre-defined within the DAT, defined separately from the DAT, defined on the platform, and/or be otherwise defined.

In a first variant, identifying variables of the DAT can include identifying a region that is pre-associated with a predetermined variable set. For example, this includes identifying a predetermined region of the DAT that is associated with a predetermined variable or set thereof. In an illustrative example, an address block is always located in the same location on a postcard and is always associated with the recipient name variable and address variable(s).

In a second variant, identifying variables of the DAT can include identifying a reserved name (e.g., reserved label, predetermined alphanumeric string, etc.) within the DAT. For example, this can include identifying "NAME" within the DAT.

In a third variant, identifying variables for the DAT can include identifying a variable indicator in the DAT (e.g., identifying a merge variable indicator). The variable indicator can be denoted by wildcards (e.g., anything in curly brackets "{{ }}", square brackets "[ ]", percentage "% %", and/or slashes "//" is treated as variable; example shown in FIG. 11; etc.), an alphanumeric string that matches a variable name from the RD, an icon associated with a variable name, reserved names (e.g., "RECIPIENT_NAME" is treated as a recipient name variable), an explicit variable name defined in the DAT (e.g., "<var> address </var>"), RD variable names (e.g., identified from the RD), and/or otherwise identified. For example, a variable indicator such as "{{first_name}}" is treated as a first name variable.

In a fourth variant, identifying variables of the DAT can include receiving the DAT variables from an external system (e.g., as part of the template, in a separate file from the template, in a separate set of layers from the template visual asset layers, etc.).

S300 can optionally include automatically determining the variable parameters, such as text size, font type, kerning, and/or other parameters. In a first variant, the variable parameter values can be determined based on the DAT variable's parameter values. For example, when a DAT variable in the DAT template has a first text size, font type, and kerning, the RD values rendered in place of the DAT variable can use the first text size, font type, and kerning. In a second variant, the variable parameter values can be specified by a user (e.g., in the RD, in an interface 140, in a set of DAT rules, etc.). In a third variant, the variable parameter values can be determined using a set of models (e.g., as discussed below, for edge case correction). In a fourth variant, the variable parameter values can be automatically determined (e.g., automatically resized to fit the region associated with the DAT variable). In a fifth variant, the variable parameter values can be default values (e.g., platform default values, user-specified default values, etc.). However, the variable parameter values can be otherwise determined.

However, the variables for the digital asset template (DAT variables) can be otherwise identified.

5.4. Mapping variables between the digital asset template and the RD S400.

Mapping variables between the digital asset template and the recipient data S400 functions to map matching variables between the DAT and the RD. S400 can be performed after S100, after S200, after S300, before S500, and/or at any other suitable time. Variables between the DAT and the RD preferably have a one-to-one mapping (e.g., each RD variable is mapped to only one DAT variable), but additionally and/or alternatively have a many-to-one mapping, many-to-many mapping, and/or have any other relationship between variables. Variable mappings between the DAT and the RD can be: determined by the variable mapping module in the asset generation system 120, received from a user (e.g., on an interface 140), and/or be otherwise determined.

Variables between the DAT and the RD are preferably matched automatically, but can additionally and/or alternatively be matched manually by a user (e.g., on an interface 140) and/or otherwise matched. Campaign settings (e.g., determined in S100) can additionally or alternatively be mapped to DAT variables in the same or different manner (example shown in FIG. 9).

In a first variant, S400 can include automatically mapping variables using variable strings and/or variable identifiers. In a first example, a variable identified in the RD is mapped to a variable identified in the DAT when the strings match (e.g., using a naïve algorithm) and/or substantially match (e.g., are within a predetermined Levenshtein distance), example shown in FIG. 8. A model can be used to determine whether strings match and/or substantially match. The model can be and/or include: regression, classification, neural networks (e.g., CNNs, DNNs, etc.), rules, heuristics, equations (e.g., weighted equations, etc.), selection (e.g., from a library), instance-based methods (e.g., nearest neighbor), regularization methods (e.g., ridge regression), decision trees, Bayesian methods (e.g., Naïve Bayes, Markov), kernel methods, probability, deterministics, support vectors, or any other suitable method. In a second example, a variable identified in the RD with a predetermined association with an icon is mapped to the icon's position in the DAT. In a third example, variables (e.g., address_line1, city, state, zip code, etc.) identified in the RD with a predetermined association with an address block are mapped to the address block's position in the DAT. However, the DAT variables and RD variables can be otherwise associated together.

In a second variant, S400 can include automatically mapping variables based on a physical location within the DAT. For example, a variable identified in the DAT is automatically mapped to the reserved region for the address block. In a second example, RD address variables are automatically mapped to the reserved region for the address block.

In a third variant, S400 can include automatically mapping variables based on attributes of and/or associated with the RD variable values. The variables can optionally be mapped using a set of mapping rules, which can be automatically defined or manually defined. For example, the RD variable value can identify a visual asset (e.g., image), wherein the visual asset is associated with a set of image attributes, such as a size and resolution. In this example, S400 can automatically map the RD variable to a DAT variable associated with a DAT region that is large enough to display the visual asset with a threshold resolution.

However, the variables can be otherwise automatically mapped.

Figure 12:
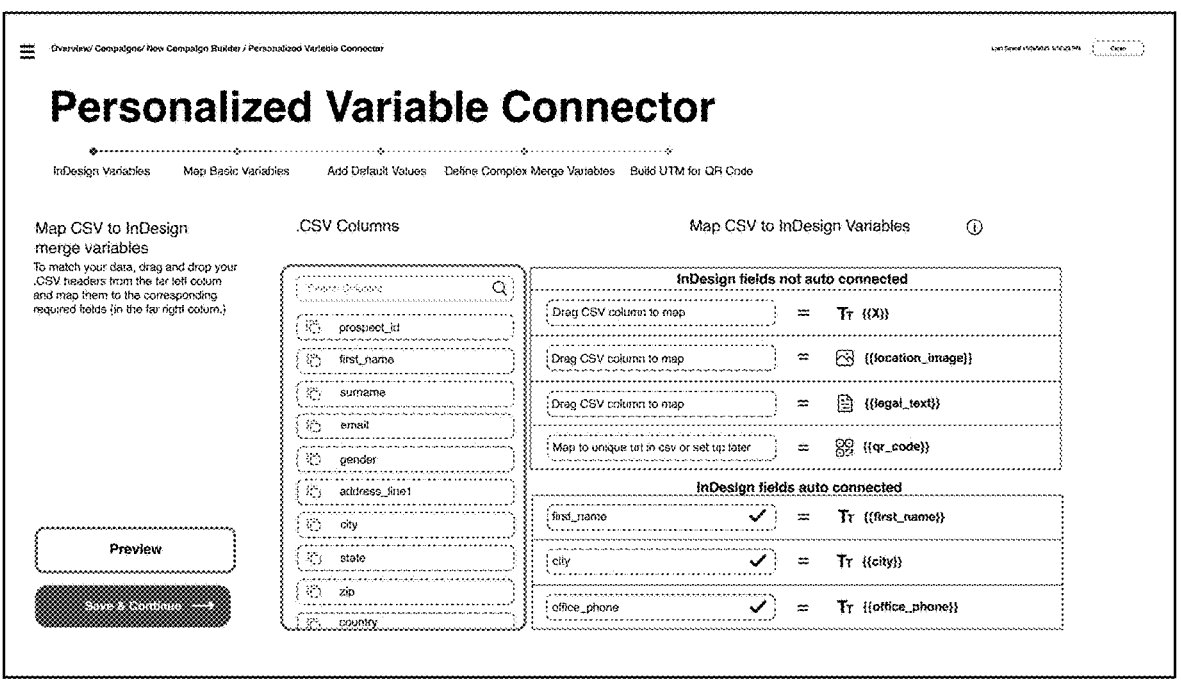
FIG. 12 is an illustrative example of mapping variables between the digital asset template and the recipient data.

In a fourth variant, S400 can include manually mapping variables. For example, manually mapping variables include presenting the RD variables and the DAT variables to a user (e.g., on an interface 140), and receiving user mappings between the variables of each set (examples shown in FIG. 8 and FIG. 12).

In a fifth variant, S400 can include: presenting RD variables (e.g., determined from the RD), and enabling the user to associate the RD variables with DAT regions (e.g., by allowing the user to drag the RD variable into the DAT region, by allowing the user to select the RD variable to associate with the DAT region, etc.). In this variant, the DAT variables can be determined from the RD variables.

In a sixth variant, S400 can include a combination of the above variants: automatically mapping variables using variable strings and/or variable identifiers and manually mapping variables. For example, S400 includes automatically mapping variables between the DAT and the RD with strings that match and/or substantially match, identifying unmatched variables (e.g., all the variables that were not matched automatically) between the DAT and the RD, presenting the unmatched variables to a user, and receiving user mappings between the unmatched variables until unmatched variables do not exist.

In a seventh variant, S400 can include receiving mapping rules from a user (e.g., on an interface 140), and automatically mapping variables using the mapping rules. For example, when there are multiple DATs, each having the same DAT variable, the mapping rules determine which DAT variable of the multiple DATs maps to the RD variable.

However, variables between the DAT and the RD can be otherwise mapped.

5.5. Generating a Set of Example Digital Assets S500.

Figure 17:
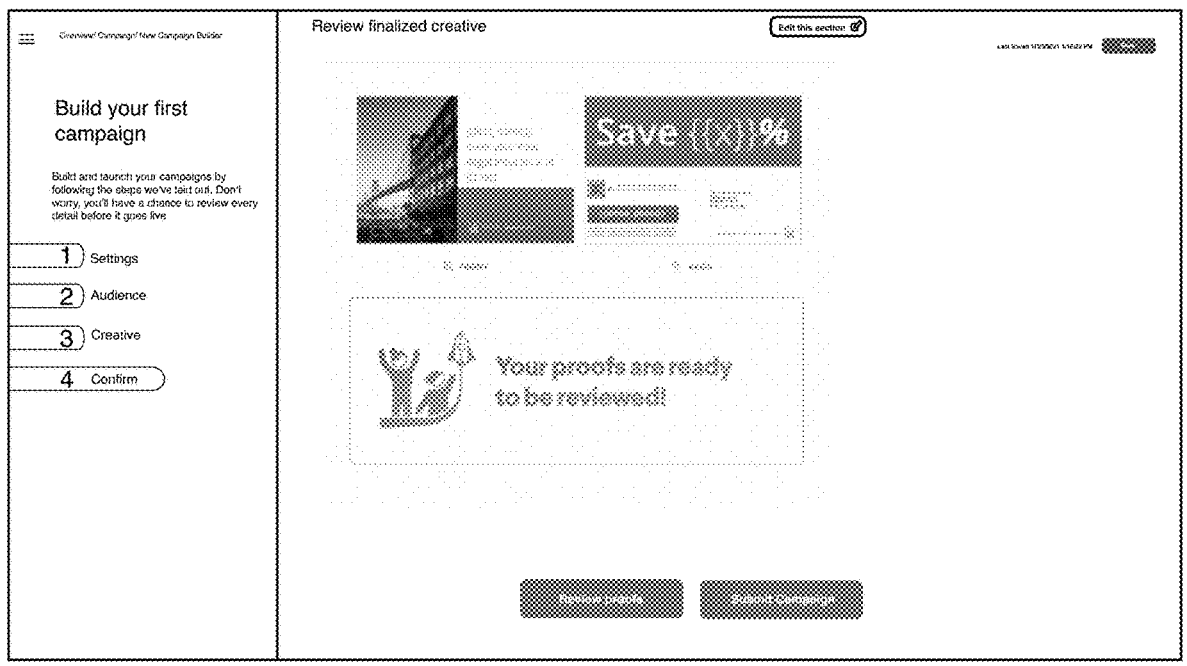
FIG. 17 is an illustrative example of reviewing a finalized digital asset template.

Generating a set of example digital assets S500 functions to provide a set of example digital assets to a user prior to bulk rendering to check for errors (e.g., edge cases); example shown in FIG. 17. S500 can be performed after S400, concurrently with S600, before S600, and/or at any other suitable time. The set of example digital assets can be generated based on a user's proofing preferences (e.g., received in campaign settings S100), alternatively not be based on a user's proofing preferences, based on a default set of rules, and/or otherwise determined. The number of example digital assets of the set is preferably less than the number of digital assets rendered (e.g., in S600), but can alternatively be equal to the number of digital assets rendered, more than the number of digital assets rendered, and/or any other suitable number. The set of example digital assets (e.g., representative digital assets) can be generated by the proofing module in the asset generation system 120 and/or otherwise be generated. The example digital assets can be: digital assets that represent a typical digital asset that will be rendered, digital assets that represent the edge cases or extremes of digital assets that will be rendered, be a random set of digital assets, and/or be any other suitable set of digital assets.

Figure 18:
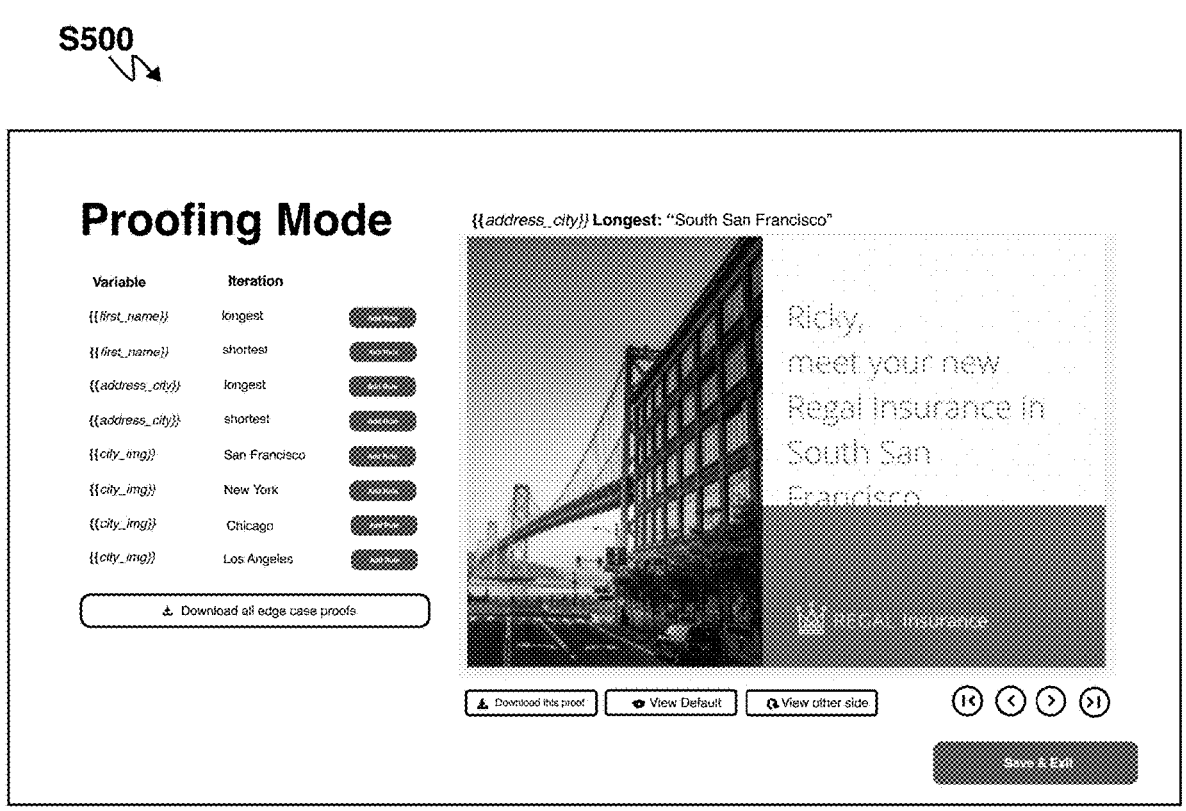
FIG. 18 is an illustrative example of generating a set of example digital assets.

In a first variant, S500 can include: determining a set of edge cases based on the RD; generating a set of example digital assets based on the campaign settings, the DAT, the mapped variables, and the set of edge cases; rendering proofs of the edge cases (example shown in FIG. 18); optionally highlighting one or more edge cases in each proof; and providing the proofs to the user (e.g., through an interface 140). The edge cases are preferably recipients with edge case values, wherein an edge case includes all RD variable values for the recipient (e.g., including the edge case value), but can alternatively be the RD variable values themselves. The edge cases can be identified as: extreme RD variable values (e.g., minima and/or maxima, such as longest and shortest text, largest and smallest image, highest and lowest resolution, etc.), RD variable values surpassing a threshold or rule (e.g., text exceeding a predetermined length, width, and/or size for the DAT region associated with the variable and/or the form factor; text with less resolution than a predetermined threshold, etc.); outliers in the RD (e.g., determined in S200); adjacent layers with less than a threshold amount of contrast (e.g., text colors with a low readability such as a white text overlaying a white background, a gray text overlaying a black background); images being cut off or not filling more than a predetermined proportion of the region (e.g., due to incorrect aspect ratios); image with less resolution than a predetermined threshold; and/or otherwise identified. The edge cases can be identified (e.g., analyzing the data or a rendered proof) using: regression, classification, neural networks (e.g., CNNs, DNNs, etc.), rules, heuristics, equations (e.g., weighted equations, etc.), selection (e.g., from a library), instance-based methods (e.g., nearest neighbor), regularization methods (e.g., ridge regression), decision trees, Bayesian methods (e.g., Naïve Bayes, Markov), kernel methods, probability, deterministics, support vectors, pattern detection methods, anomaly detection models, novelty detection models, distance models (e.g., calculating a distance, such as a Levenshtein distance, between a value for a recipient and the values for remainder of the population), statistical methods (e.g., numeric outliers, expectation-maximization methods, etc.), gaussian methods (e.g., z-score), and/or be identified using any other suitable method.

In a first example, S500 includes identifying all names exceeding a predetermined length (e.g., max address block length; max length of a digital template region, given the region's font type and size; etc.), wherein proofs can be rendered using the identified names.

In a second example, S500 includes identifying all addresses exceeding a predetermined length (e.g., max address block length; max length of a digital template region, given the region's font type and size; etc.), wherein proofs can be rendered using the identified addresses.

In a third example, S500 includes identifying all images that are larger than the assigned region (e.g., that will be cropped or cutoff), wherein proofs can be rendered using the identified images.

In a fourth example, S500 includes identifying contrast errors between upper layers and lower layers (e.g., text won't show up), wherein proofs can be rendered for the recipients with identified contrast errors.

In a fifth example, S500 includes identifying all images that have less resolution than a predetermined threshold (e.g., as a result of automatic scaling when the image is scaled beyond its original size, the original image size has a lower resolution than the predetermined threshold, etc.), wherein proofs can be rendered for the recipients using the identified images.

In a sixth example, S600 includes identifying values (and/or the recipients associated with the value), for a given RD variable, that are beyond a threshold similarity score (e.g., distance, statistical measure, etc.) from the other values for the RD variable (e.g., the centroid(s) of one or more clusters of RD variable values, the RD variable value distribution, etc.). For example, this can identify text that is substantially longer or shorter than the rest of the recipients, addresses that deviate from the other recipients (e.g., geographically distal the other recipients' addresses; in a different format from the other recipients' addresses, etc.), images that are infrequently used or mentioned in the RD, and/or other deviant RD variable values.

However, the set of edge cases can be otherwise determined.

In a second variant, S500 can include: determining a set of unique permutations (e.g., all unique permutations, randomly selected unique permutations, etc.) based on the RD; generating a set of example digital assets based on the campaign settings, the DAT, the mapped variables, and the set of unique permutations; rendering proofs of the set of unique permutations (e.g., every version of a digital asset that is unique); and providing the proofs to the user (e.g., through an interface 140).

However, the set of edge cases can be otherwise identified.

Generating the edge case proof (e.g., example digital asset) functions to provide the user with a digital version of the physical asset that will be printed, which enables the user to visually inspect the proof for visual asset quality, check for errors (e.g., spelling mistakes, formatting errors, etc.), ensure that the visual assets (e.g., images, text, etc.) are within the region boundaries and/or outside of reserved DAT regions, ensure that the visual assets fill the entire DAT region(s) (e.g., extend to the bleed line), review the personalization of the assets, and/or otherwise review aspects of the asset prior to printing. The edge case proof is preferably generated in the same way the digital proofs are generated (e.g., in S600), but can be otherwise generated. In a first variant, generating the edge case proof includes generating a proof for each identified edge case recipient. In this variant, the RD variable values for the recipient associated with the edge case value can be used to generate the proof. In a second variant, generating the edge case proof includes generating a proof using the edge case values from one or more recipients. In this variant, the resultant proof can be for a synthetic, edge case recipient, and can be for review only (e.g., would not be printed by the print partner). For example, the edge case proof can be generated using the most extreme values in the RD (e.g., across all recipients) for each RD variable.

However, the set of example digital assets can be otherwise generated.

The user can review the proofs (e.g., on an interface 140), download the proofs (e.g., to attach to an email), print the proofs, share the proofs (e.g., via email, SMS, social media, etc.), and/or otherwise use the proofs.

Furthermore, the user can manually identify and/or fix the errors (e.g., formatting errors, copy errors, etc.) after reviewing the proofs (e.g., on the interface 140). Additionally or alternatively, S500 can include automatically identifying the errors and/or include automatically recommending solutions for or automatically fixing the errors (e.g., by automatically scaling text, adjusting kerning, adjusting spacing, scaling images, suggesting replacements, etc.). In a first variant, the errors are determined based on the RD variable values, without rendering a proof. For example, a maximum number of characters can be determined for a DAT variable based on the template area associated with the DAT variable (and optionally the DAT variable parameter values), and the RD can be analyzed to determine whether there are any RD variable values exceeding the character limit. In a second variant, the errors are determined by rendering digital proofs (e.g., using edge case recipient information), then analyzing the proofs for errors. The proof errors (e.g., printing errors, edge case errors, etc.) can be determined using: a model (e.g., a CNN, etc.), a set of heuristics, and/or any other suitable method. For example, a proof error can be detected when an RD variable value exceeds the boundaries associated with the respective DAT variable, is within a threshold distance (e.g., pixel distance) of the boundaries, is misshapen (e.g., a classification certainty is lower than a threshold value), and/or otherwise determined.

Figure 24:
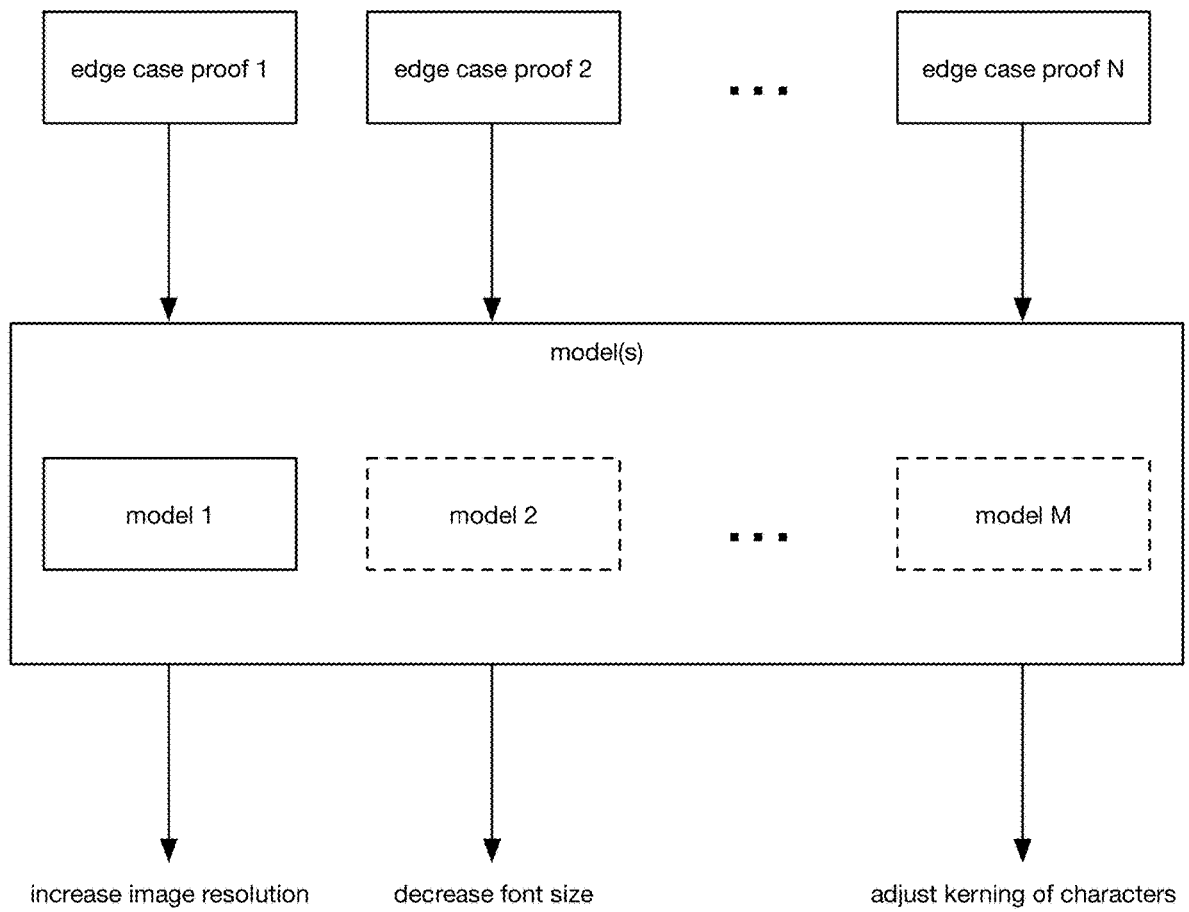
FIG. 24 is an illustrative example of recommending solutions to fix the errors using a set of models.

Recommended solutions can be related to and/or include modifying: a RD variable value, a region and/or a layer of the DAT, campaign settings, variable parameter values (e.g., font size, image size, kerning, etc.), resolution (e.g., text resolution, image resolution, etc.), contrast, saturation, position, centering, scaling (e.g., image scaling, text scaling, etc.), spacing (e.g., character spacing), kerning (character kerning), spelling, grammar, splitting (e.g., characters of a word are split between two lines, an image is split between two pages, etc.), and/or any other suitable recommendation for errors. The errors can be identified and/or fixed and/or the recommended solutions can be determined using: a set of models (e.g., ML models; example shown in FIG. 24), rules (e.g., predetermined rules, user-specified rules, etc.), and/or any other suitable methods. The model can be and/or include: regression, classification, neural networks (e.g., CNNs, DNNs, etc.), rules, heuristics, equations (e.g., weighted equations, etc.), selection (e.g., from a library), instance-based methods (e.g., nearest neighbor), regularization methods (e.g., ridge regression), decision trees, Bayesian methods (e.g., Naïve Bayes, Markov), kernel methods, probability, deterministics, support vectors, pattern detection methods, anomaly detection models, novelty detection models, distance models, statistical methods (e.g., numeric outliers, expectation-maximization methods, etc.), gaussian methods (e.g., z-score), and/or any other suitable method. For example, a neural network can automatically detect kerning and/or spacing character anomalies and/or adjust the kerning and/or spacing of characters when populated into the DAT.

However, the errors within the set of example digital assets can be otherwise identified and/or fixed.

S500 can additionally include sending a notification to a user (e.g., on an interface 140) based on the set of example digital assets. The notification can include: whether there are errors, types of errors, number of errors, recommendations of solutions for fixing the errors, whether the errors have been fixed, and/or any other suitable information.

However, the notification can be otherwise determined.

5.6. Rendering a Set of Digital Assets S600.

Figure 13:
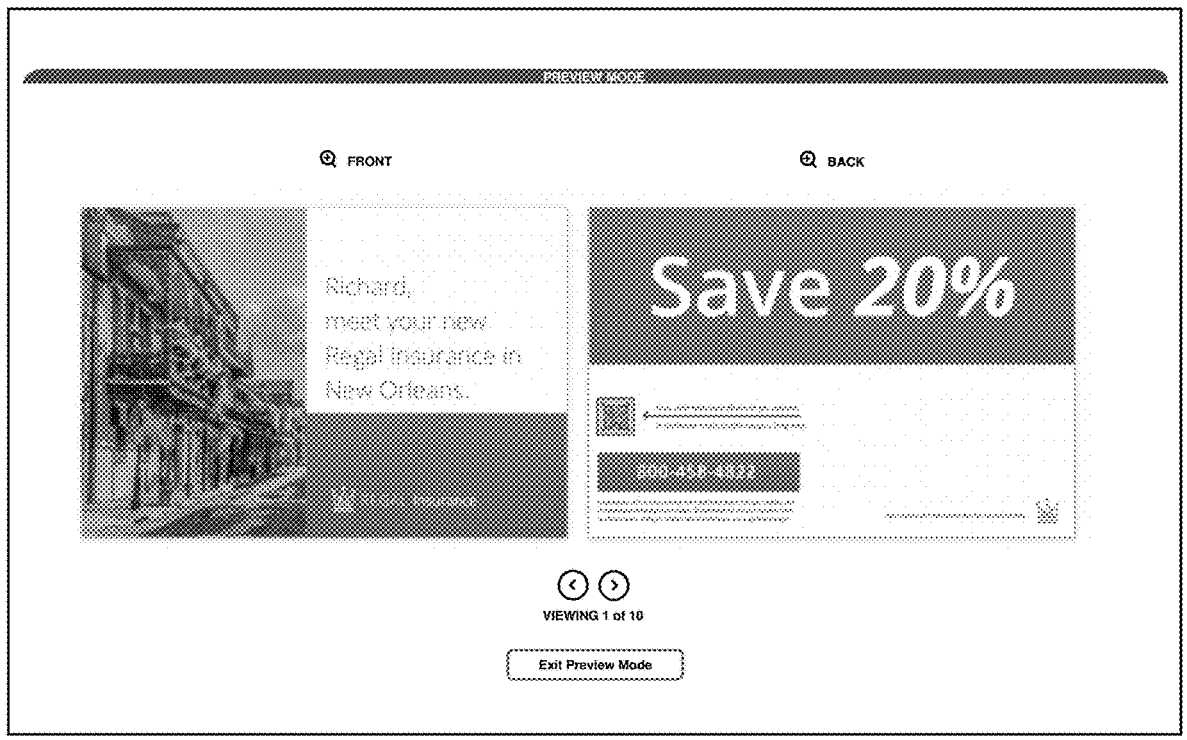
FIG. 13 is an illustrative example of a rendered digital asset.

Rendering a set of digital assets S600 functions to render a set of digital assets based on the RD, the DAT, and optionally the campaign settings. S600 can be performed after S400, after S500, concurrently with S500, before S700, and/or at any other suitable time. Each rendered digital asset (example shown in FIG. 13) can have the same file format as the DAT, but can alternatively have a different file format compared to the DAT. The set of digital assets can be rendered by the rendering module in the asset generation system 120 and/or be otherwise rendered.

S600 preferably includes populating a DAT region with a visual asset associated with the DAT variable for the region, but can additionally and/or alternatively be retrieved from a database 150, and/or be otherwise performed. The visual asset associated with the DAT variable can be: predetermined (e.g., by the DAT), identified by a variable value, and/or otherwise identified. The variable value is preferably the value for the RD variable corresponding to the DAT variable, but can be any other value.

In an example, S600 includes, for each recipient, identifying a DAT variable associated with the DAT region, finding the DAT variable's value for the recipient in the RD (e.g., wherein the DAT variable value is the corresponding RD variable's value), and populating a visual asset (e.g., a text, an image, a QR code, etc.; example shown in FIG. 17) specified by the variable value into the DAT region. In a first illustrative example, S600 includes, for each recipient, identifying that a "background_image" variable is associated with the background layer of the DAT (e.g., DAT variable value "layer 1"), finding the "background_image" variable value for the recipient in the RD, retrieving the identified image, and rendering the identified image as the background layer. In a second illustrative example, S600 includes, for each recipient, identifying an "address_line1" variable, a "city" variable, a "state" variable, and a "zip" variable are associated with the address block region of the DAT, finding the "address_line1" variable value (e.g., 123 Fake St), the "city" variable value (e.g., New York), the "state" variable value (e.g., NY), and the "zip" variable value (e.g., 10001) for the recipient in the RD, and rendering the "address_line1" variable value, the "city" variable value, the "state" variable value, and the "zip" variable value within the address block region (e.g., example shown in FIG. 9).

In a first variant, S600 can include rendering a digital asset for each recipient.

In a second variant, S600 can include rendering unique permutations of the digital asset. The unique permutations are preferably unique combinations of non-recipient-specific variables, but can alternatively be unique combinations of recipient-specific variables, unique combinations of all variables, and/or any other suitable combination of variables.

In a third variant, S600 can include rendering randomly selected digital asset instances (e.g., using DAT values for a randomly selected recipient).

However, the set of digital assets can be otherwise rendered.

S600 can additionally include reducing the size of the rendered set of digital assets (e.g., how much storage the rendered set of digital assets consumes). This can facilitate faster, more robust, and/or less error-prone proof transmission to the print partners, and/or confer other benefits.

In a first variant, reducing the size of the rendered set of digital assets can include decreasing the number of pages of the file (e.g., a PDF) to a single page that can have data (e.g., recipient-specific data) swapped into it, therefore reducing the size of the file.

In a second variant, reducing the size of the rendered set of digital assets can include decreasing the number of sheets of a file (e.g., a PDF) to a single sheet (e.g., each sheet can have multiple pages) such that identical elements are references instead of exact copies.

In a third variant, multiple digital assets (e.g., proofs) can be batched into a single file (e.g., a zip file), instead of being transmitted independently.

However, the size of the rendered set of digital assets can be otherwise reduced.

5.7. Printing a Physical Version of Each Digital Asset S700.

Printing a physical version of each digital asset S700 functions to create the physical asset for each digital asset (e.g., rendered digital asset in S600). S700 can be performed after S600, before S800, and/or at any other suitable time. S700 is preferably performed by one or more print partners that the digital assets were routed to, but can alternatively be performed by one or more delivery services, one or more third-party transportation services, and/or any other suitable entity.

S700 can additionally include routing the set of digital assets to one or more print partners. The set of digital assets can be the original rendered digital assets, reduced size versions of the rendered digital assets, example digital assets, and/or any other suitable digital asset. The set of digital assets is preferably routed by the routing system 130, but can additionally and/or alternatively be routed by any other suitable system. For example, routing the set of digital assets includes routing the set of digital assets and the respective addresses to a print partner (e.g., individually or as part of a batch). In an example, S700 can be performed using the method disclosed in U.S. application Ser. No. 17/540,521 filed 2 Dec. 2021, incorporated herein in its entirety by this reference. However, the set of digital assets can be otherwise routed to one or more print partners.

The physical asset is preferably printed at a time specified by the platform (e.g., backcalculated based on an estimated delivery date, calculated based on a target delivery date, calculated based on a target mailing date, etc.), but can alternatively be printed at a time determined by a print partner, at a time determined by a delivery service, a random time, at a time specified by the campaign settings, and/or any other suitable time.

However, the physical version of each digital asset can be otherwise printed.

5.8. Delivering the Physical Assets S800.

Delivering the physical assets S800 functions to deliver each physical asset to a recipient location. S800 can be performed after S700 and/or at any other suitable time. S800 is preferably performed by one or more delivery services, but can alternatively be performed by one or more print partners, one or more third-party transportation services, and/or any other suitable entity. The physical assets can be mailed by a time specified by the platform, but can alternatively be mailed by a time determined by a print partner, by a delivery service, by a random time, and/or any other suitable time. The mailed time can be: on the target mailing date specified in campaign settings (e.g., S100), before the target mailing date, after the target mailing date, and/or any other suitable time. The physical assets are preferably delivered by a time specified by the platform (e.g., an estimated time to delivery), but can alternatively be delivered by a time determined by a delivery service, by a random time, and/or any other suitable time. The delivery time specified by the platform is preferably on the target delivery date specified in campaign settings (e.g., S100) but can additionally and/or alternatively be before the target delivery date, after the target delivery date, and/or any other suitable time. The recipient location is preferably specified on the physical asset, but can alternatively not be specified on the physical asset.

However, the physical assets can be otherwise delivered.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method, comprising:
   determining a set of mail campaign settings;
   determining recipient data (RD) for a set of recipients and a set of RD variables associated with the RD;
   determining a digital asset template (DAT) and a set of DAT variables associated with the DAT;
   determining a variable map between the RD variables from the set of RD variables and the DAT variables from the set of DAT variables;
   determining a set of edge case recipients based on the RD, wherein the set of edge case recipients comprises recipients associated with at least one of: text exceeding a predetermined length or an image larger than a predetermined size;
   automatically determining a set of solutions to fix print errors caused by the set of edge case recipients;
   determining a set of unique permutations based on the RD, wherein the set of unique permutations comprises unique combinations of non-recipient-specific variable values;
   generating a set of example digital assets based on the set of unique permutations, the set of physical mail campaign settings, the DAT, and the variable map, wherein the set of example digital assets is displayed on an interface to a user; and
   rendering a set of digital assets comprising a digital asset for each recipient of the set of recipients, comprising populating the DAT based on the set of mail campaign settings, the RD, the variable map, and the set of solutions.

2. The method of claim 1, wherein populating the DAT comprises, for each digital asset, dynamically filling each DAT variable in the DAT with values for the respective RD variable for the respective recipient from the RD.

3. The method of claim 1, further comprising:
   generating a uniform resource indicator (URI) for each recipient of the set of recipients based on the set of mail campaign settings; and
   rendering a representation of the URI within the respective digital asset.

4. The method of claim 1, further comprising receiving a default value for a RD variable of the set of RD variables, wherein the set of digital assets is further rendered based on the default value.

5. The method of claim 1, wherein the variable map comprises a one-to-one variable mapping between the set of RD variables and the set of DAT variables.

6. The method of claim 1, wherein determining the variable map comprises automatically determining a set of mappings between the RD variables of the set and the DAT variables of the set when variable strings match within a predetermined threshold.

7. The method of claim 1, wherein determining the set of DAT variables associated with the DAT comprises identifying a set of variable indicators in the DAT, wherein the set of DAT variables are determined based on the set of variable indicators.

8. The method of claim 7, wherein the DAT, comprising the set of variable indicators, is received from an external system.

9. An asset generation system, comprising:
   a processing system, configured to:
     determine a set of physical mail campaign settings;
     determine recipient data (RD) for a set of recipients and a set of RD variables associated with the RD;
     receive a digital asset template (DAT) comprising a set of DAT variables;
     parse the set of DAT variables from the DAT;
     determine a variable map between the set of RD variables and the set of DAT variables;
     determine a set of edge case recipients based on the RD, wherein the set of edge case recipients comprises recipients associated with at least one of text exceeding a predetermined length or an image larger than a predetermined size;
     automatically determining a set of solutions to fix print errors caused by the set of edge case recipients;
     determine a set of unique permutations based on the RD, wherein the set of unique permutations comprises unique combinations of non-recipient-specific variable values;
     generate a set of example digital assets based on the set of unique permutations, the set of physical mail campaign settings, the DAT, and the variable map, wherein the set of example digital assets is displayed on an interface to a user; and
     render a digital asset for each recipient of the set of recipients, comprising populating the DAT based on the set of physical mail campaign settings, the RD, and the variable map.

10. The method of claim 9, further comprising generating a set of example digital assets based on the set of edge case recipients, the set of physical mail campaign settings, the DAT, and the variable map, wherein the set of example digital assets is displayed on an interface to a user.

11. The system of claim 9, wherein determining the variable map comprises:
    receiving a set of mapping rules from a user; and
    automatically determining a set of mappings between the set of RD variables and the set of DAT variables based on the set of mapping rules.

12. The system of claim 9, wherein determining the variable map comprises:
    displaying the set of RD variables and the set of DAT variables to a user on an interface; and
    receiving a set of mappings between the RD variables of the set and the DAT variables of the set from the user.

13. The system of claim 9, wherein rendering the digital asset for each recipient of the set of recipients further comprises reducing a size of the rendered digital asset, wherein the reduced size digital asset is routed to a print partner.

14. The system of claim 9, wherein rendering the digital asset for each recipient of the set of recipients further comprises:
- identifying a DAT graphical region associated with a DAT variable of the set;
- determining a RD variable value for the RD variable mapped to the DAT variable for each recipient; and
- rendering a graphical asset associated with the RD variable value into the DAT graphical region.

15. The system of claim 14, wherein the RD variable value is a QR code, wherein the processing system is further configured to generate campaign metadata when the QR code is scanned.

16. The system of claim 15, wherein the campaign metadata comprises at least one of recipient-specific variable values associated with the recipient, time of scan, or location of scan.

17. The system of claim 14, wherein the RD variable value comprises an identifier for a visual asset stored within a visual asset database, wherein the graphical asset comprises the visual asset retrieved from the visual asset database.

18. The system of claim 9, wherein the processing system comprises:
- an interface configured to receive the set of physical mail campaign settings, the RD, and the DAT; and
- a rendering system configured to render the digital asset for each recipient of the set of recipients.

19. The system of claim 9, where the processing system is further configured to:
- determine a set of edge case recipients based on the RD;
- render a set of edge case digital assets based on the set of edge case recipients;
- determine errors in the set of edge case digital assets; and
- determine a set of solutions to fix the errors, wherein the set of digital assets are rendered again based on the set of solutions.

* * * * *